(12) United States Patent
Wolberg et al.

(10) Patent No.: US 11,036,200 B2
(45) Date of Patent: Jun. 15, 2021

(54) LAST RESORT FREQUENCY MECHANISM IN A WIRELESS COMMUNICATION SYSTEM

(71) Applicant: CORETIGO LTD., Netanya (IL)

(72) Inventors: Dan Wolberg, Yanuv (IL); Nir Efraim Joseph Tal, Haifa (IL)

(73) Assignee: Coretigo Ltd., Netanya (IL)

( * ) Notice: Subject to any disclaimer, the term of this patent is extended or adjusted under 35 U.S.C. 154(b) by 8 days.

(21) Appl. No.: 16/600,977

(22) Filed: Oct. 14, 2019

(65) Prior Publication Data

US 2020/0120033 A1 Apr. 16, 2020

Related U.S. Application Data

(60) Provisional application No. 62/745,685, filed on Oct. 15, 2018, provisional application No. 62/870,273, filed on Jul. 3, 2019.

(51) Int. Cl.
*H04L 5/00* (2006.01)
*H04L 1/00* (2006.01)
(Continued)

(52) U.S. Cl.
CPC ....... *G05B 19/052* (2013.01); *G05B 19/4185* (2013.01); *H04B 1/713* (2013.01);
(Continued)

(58) Field of Classification Search
CPC ........ H04B 1/7143; H04B 2001/71362; H04B 2201/71384; H04B 1/715; H04B 2201/71323; H04B 1/713; H04B 1/7136; G05B 2219/15117; G05B 19/0426; G05B 19/4185; H04L 1/1664; H04L 1/0016; H04L 1/18; H04L 1/0083; H04L 47/2466; H04L 47/6215; H04L 5/0055;
(Continued)

(56) References Cited

U.S. PATENT DOCUMENTS 6,751,249 B1 * 6/2004 Cannon .................. H04B 1/715
370/332
2009/0097467 A1 * 4/2009 Sugitani ............... H04B 7/2615
370/345

(Continued)

*Primary Examiner* — Mohamed A Kamara
(74) *Attorney, Agent, or Firm* — Zaretsky Group PC; Howard Zaretsky

(57) ABSTRACT

A novel and useful acknowledgement and adaptive frequency hopping mechanism for use in wireless communication systems such as IO-Link Wireless. One or two additional acknowledgement bits are added to packet transmissions. One is a current acknowledgment bit which indicates whether a packet was successfully received anytime during the current cycle. The second bit is a previous acknowledgment bit which indicates whether packets were received successfully anytime during the previous cycle. An adaptive hopping table is constructed using a greedy algorithm which chooses frequencies with the best PER for transmission of higher priority packets, while equalizing the PER products across cycles. A last resort frequency mechanism further improves transmission success by switching to a better performing channel for the last subcycle when previous attempts to transmit a high priority packet have failed.

20 Claims, 25 Drawing Sheets

(51) Int. Cl.
  *G05B 19/05* (2006.01)
  *G05B 19/418* (2006.01)
  *H04L 1/20* (2006.01)
  *H04B 1/7136* (2011.01)
  *H04B 1/713* (2011.01)
  *H04B 1/7143* (2011.01)
  *H04L 12/855* (2013.01)
  *H04L 12/863* (2013.01)
  *H04W 28/02* (2009.01)
  *H04W 28/04* (2009.01)
  *H04W 84/20* (2009.01)

(52) U.S. Cl.
  CPC ......... *H04B 1/7136* (2013.01); *H04B 1/7143* (2013.01); *H04L 1/0061* (2013.01); *H04L 1/0083* (2013.01); *H04L 1/203* (2013.01); *H04L 5/0055* (2013.01); *H04L 47/2466* (2013.01); *H04L 47/6215* (2013.01); *H04W 28/0268* (2013.01); *H04W 28/04* (2013.01); *G05B 2219/15117* (2013.01); *H04B 2001/71362* (2013.01); *H04W 84/20* (2013.01)

(58) Field of Classification Search
  CPC .. H04L 1/203; H04L 1/0061; H04W 28/0205; H04W 28/0268; H04W 28/04; H04W 84/20
  See application file for complete search history.

(56) References Cited

U.S. PATENT DOCUMENTS

| | | | |
|---|---|---|---|
| 2012/0224608 A1* | 9/2012 | Yun | H04L 5/0044 375/134 |
| 2019/0238397 A1* | 8/2019 | Rentschler | H04B 10/03 |
| 2019/0320395 A1* | 10/2019 | Wong | H04W 52/265 |

* cited by examiner

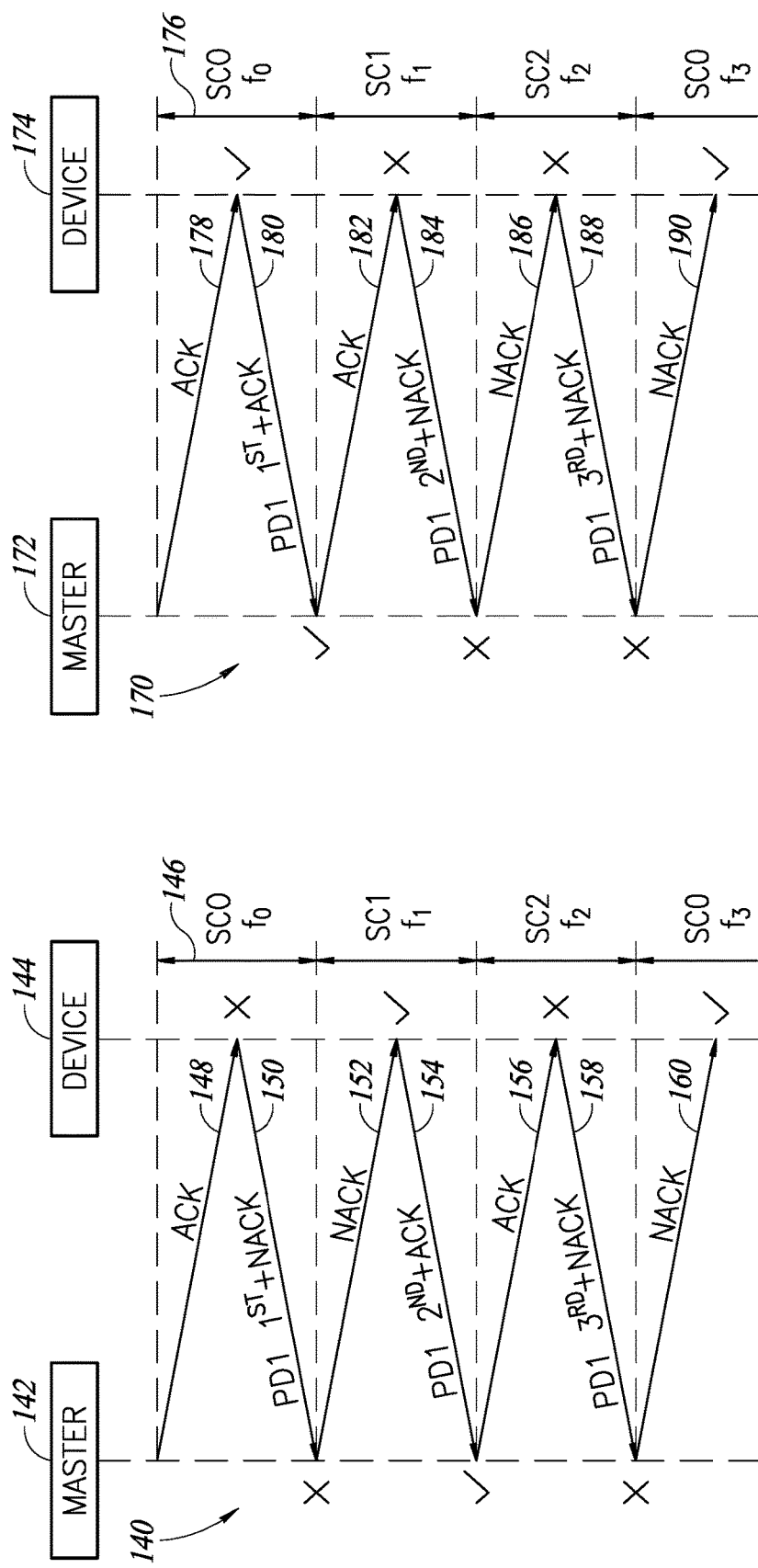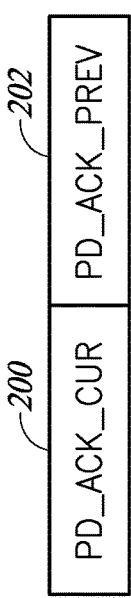
FIG. 9
FIG. 10
FIG. 8

| TRACK 1 | 2457 | 2478 | 2466 | 2455 | 2476 | 2464 | 2430 | 2474 | 2462 | 2472 | 2426 | 2428 | 2470 | 2458 |
|---|---|---|---|---|---|---|---|---|---|---|---|---|---|---|
| TRACK 2 | 2461 | 2427 | 2470 | 2459 | 2452 | 2468 | 2457 | 2478 | 2466 | 2476 | 2430 | 2474 | 2462 | 2458 |
| TRACK 3 | 2464 | 2430 | 2473 | 2462 | 2428 | 2471 | 2460 | 2426 | 2469 | 2424 | 2456 | 2426 | 2474 | 2465 |
| TRACK 4 | 2467 | 2456 | 2476 | 2465 | 2454 | 2474 | 2463 | 2429 | 2472 | 2427 | 2459 | 2477 | 2425 | 2468 |
| TRACK 5 | 2470 | 2459 | 2424 | 2468 | 2457 | 2477 | 2466 | 2455 | 2475 | 2430 | 2462 | 2430 | 2428 | 2471 |

FREQUENCY

SUB CYCLE0 | SUB CYCLE1 | SUB CYCLE2
CYCLE 0 | CYCLE 1 | CYCLE 2 | CYCLE 3 | CYCLE 4

| TRACK 1 | 2424 | 2467 | 2456 | 2477 | 2465 | 2454 | 2475 | 2463 | 2429 | 2473 | 2461 | 2427 | 2471 | 2459 | 2425 | 2469 |
|---|---|---|---|---|---|---|---|---|---|---|---|---|---|---|---|---|
| TRACK 2 | 2428 | 2471 | 2460 | 2426 | 2469 | 2458 | 2424 | 2467 | 2456 | 2477 | 2465 | 2454 | 2475 | 2463 | 2429 | 2473 |
| TRACK 3 | 2454 | 2474 | 2463 | 2429 | 2472 | 2461 | 2427 | 2470 | 2459 | 2425 | 2468 | 2457 | 2478 | 2466 | 2455 | 2476 |
| TRACK 4 | 2457 | 2477 | 2466 | 2455 | 2475 | 2464 | 2430 | 2473 | 2462 | 2428 | 2471 | 2460 | 2426 | 2469 | 2458 | 2424 |
| TRACK 5 | 2460 | 2425 | 2469 | 2458 | 2478 | 2467 | 2456 | 2476 | 2465 | 2454 | 2474 | 2463 | 2429 | 2472 | 2461 | 2427 |

FREQUENCY

CYCLE 5 | CYCLE 6 | CYCLE 7 | CYCLE 8 | CYCLE 9 | CYCLE 10

FIG. 21

CHANNEL FREQUENCY PER — 590

| 0 | $10^{-6}$ | $10^{-3}$ | $10^{-2}$ | $10^{-2}$ | $10^{-2}$ | $10^{-1}$ | $10^{-1}$ | $10^{-1}$ |
|---|---|---|---|---|---|---|---|---|
| ~~5~~ | ~~9~~ | ~~13~~ | 17 | 65 | 25 | 32 | 47 | 37 |

FIG. 25A

592 — CHANNEL FREQUENCY

|  | CYCLE0 | CYCLE1 | CYCLE2 |
|---|---|---|---|
| SUBCYCLE 2 |  |  | 65 |
| SUBCYCLE 1 |  |  | 17 |
| SUBCYCLE 0 | 5 | 9 | 13 |

FIG. 25B

594 — CHANNEL FREQUENCY

|  | CYCLE0 | CYCLE1 | CYCLE2 |
|---|---|---|---|
| SUBCYCLE 2 |  |  | $10^{-2}$ |
| SUBCYCLE 1 |  |  | $10^{-2}$ |
| SUBCYCLE 0 | $10^{-6}$ | $10^{-6}$ | $10^{-3}$ |
| PER PRODUCT | $10^{-6}$ | $10^{-6}$ | $10^{-7}$ |

FIG. 25C

CHANNEL FREQUENCY PER — 600

| 0 | $10^{-6}$ | $10^{-3}$ | $10^{-2}$ | $10^{-2}$ | $10^{-2}$ | $10^{-1}$ | $10^{-1}$ | $10^{-1}$ |
|---|---|---|---|---|---|---|---|---|
| ~~5~~ | ~~9~~ | ~~13~~ | ~~17~~ | ~~65~~ | 25 | 32 | 47 | 37 |

FIG. 26A

602 — CHANNEL FREQUENCY

|  | CYCLE0 | CYCLE1 | CYCLE2 |
|---|---|---|---|
| SUBCYCLE 2 | 37 | 47 | 65 |
| SUBCYCLE 1 | 25 | 32 | 17 |
| SUBCYCLE 0 | 5 | 9 | 13 |

FIG. 26B

604 — CHANNEL FREQUENCY

|  | CYCLE0 | CYCLE1 | CYCLE2 |
|---|---|---|---|
| SUBCYCLE 2 | $10^{-1}$ | $10^{-1}$ | $10^{-2}$ |
| SUBCYCLE 1 | $10^{-2}$ | $10^{-1}$ | $10^{-2}$ |
| SUBCYCLE 0 | $10^{-6}$ | $10^{-6}$ | $10^{-3}$ |
| PER PRODUCT | $10^{-9}$ | $10^{-8}$ | $10^{-7}$ |

FIG. 26C

LAST RESORT FREQUENCY MECHANISM IN A WIRELESS COMMUNICATION SYSTEM

REFERENCE TO PRIORITY APPLICATIONS

This application claims the benefit of U.S. Provisional Application No. 62/745,685, filed Oct. 15, 2018, entitled "System And Method For Ensuring Reliable Delivery Of Critical Data For Critical Mission Wireless Communication Systems" and U.S. Provisional Application No. 62/870,273, filed Jul. 3, 2019, entitled "Techniques For Improving Performance of IO-Link Wireless (IOLW) Protocol," both of which are incorporated herein by reference in their entirety.

FIELD OF THE DISCLOSURE

The subject matter disclosed herein relates to the field of data communications and more particularly relates to a system and method of packet acknowledgement and adaptive frequency hopping, as well as a last resort frequency mechanism for use in a wireless communication system such as IO-Link Wireless.

BACKGROUND OF THE INVENTION

Mission critical wireless link (MCWL) communications requires wireless communications standards that ensure the highest available reliability of wireless communications (e.g., low packet error rate, minimal undetected error rates, etc.), coupled with low and bounded latency in the various protocol layers. An example of such systems are industrial and production plants that employ a large number of connected devices and require MCWL communication to produce the desired products.

Industrial systems include a variety of components, including a multitude of sensors and actuators that are implemented to execute various automated tasks in order to produce a desired product or carry out a specific process. Each individual industrial component is typically either controlled or communicated with. For example, a controlled component such as an actuator is instructed to move a robotic arm in a particular manner. A sensor, for example, is communicated with when a sensor value reading is required to adjust a process accordingly.

With the onset of the Industry 4.0 (i.e. Industrial IoT) evolution, communication needs are changing rapidly. Machine-to-machine (M2M) communication such as connected robots, warehouse automation, and factory processing machinery are becoming more and more prevalent and demanding higher availability, better robustness, lower latency, and deterministic patterns. In this evolution, cable based communication simply cannot fulfil the requirements demanded by the tremendous increase in connected devices in terms of flexibility, mobility, and monitoring.

IO-Link is a short distance, bidirectional, digital, point-to-point, wired or wireless industrial communications networking standard (IEC 61131-9) used for connecting digital sensors and actuators to either a type of industrial fieldbus or a type of industrial Ethernet. It provides a technological platform that enables the development and use of sensors and actuators that can produce and consume enriched sets of data that in turn can be used for economically optimizing industrial automated processes and operations.

IO-Link Wireless defines wireless network communication between sensors, actuators and controllers (PLC) in the factory automation environment. It was designed to provide a similar level of performance and backward compatible interface as with cables (IO-Link wired) so that the migration from wired to wireless systems is made easy. IO-Link Wireless provides deterministic minimal latency of 5 msec communication with 40 nodes which may be sensors or actuators. It presents reliability that is better than $10^{-9}$ packet error rate (PER) in ideal cases. In comparison, other wireless standards such as WLAN, Bluetooth, and Zigbee have PERs that are six orders of magnitude less reliable (e.g., $10^{-3}$) in industrial environments.

In data networking, telecommunications, and computer buses, an acknowledgement (ACK) is a signal passed between communicating processes, computers, or devices to signify acknowledgement, or receipt of message, as part of a communications protocol. The negative acknowledgement (NACK) signal is sent to reject a previously received message, or to indicate some kind of error. Acknowledgements and negative acknowledgements inform a sender of the receiver's state so that it can adjust its own state accordingly.

In addition, data messages in telecommunications often contain checksums to verify the integrity of the payload and header. Checksums work in such a way that if a single bit of the data is corrupted, the checksum has a different value, so they can provide an inexpensive way to check for signal integrity. If a message is received with an invalid checksum (i.e. the data received has a different checksum than the locally computed checksum over the message), the receiver knows that some information was corrupted. Most often, when checksums are employed, a corrupted message received will either not be served an ACK signal, or will be served a NACK signal.

Many protocols such as IO-Link involve sending critical data, e.g., Process Data (PD), from senders to recipients and subsequent ACK/NACK packets in the opposite direction. For a successful transaction to occur, as well as the sender to know positively that the critical data has been received, a critical data message and its subsequent ACK message need to be received successfully. This imposes a significant hurdle under adverse conditions such as fading channels, strong interferers, noisy environments, etc. Even with multiple retransmissions, poor physical conditions may prevent the ACK and/or NACK message from being received, even if the original critical data message was successfully received.

Within networks such as IO-Link, it is necessary to ensure accurate and efficient delivery of process data, e.g., critical cycle data, between paired devices and the master, i.e. between the actuators and sensors of the system and the master. The system often operates over the 2.4 GHz industrial, scientific, and medical (ISM) radio band, which is also used for many common wireless devices, including wireless routers, monitors, cordless telephones, and the like. Thus, it is critical to ensure that the components of the system do not experience interference that could negatively affect communication between the various components.

Therefore, there is a need for an acknowledgement mechanism, that alleviates the need for two subsequent packets to be received successfully in order for a transmission to be deemed successful. Such a mechanism should not overly burden the controllers, sensors, and actuators, in complexity and power requirements and is preferably backward compatible with existing components.

In addition, there is a need for a mechanism that is able to equalize the packet error rate across cycles. Moreover, there is a need for a last ditch mechanism that can be used to avoid cycle errors when possible.

SUMMARY OF THE INVENTION

The present invention is an acknowledgement and adaptive frequency hopping mechanism for use in wireless communication systems such as IO-Link Wireless. One or two additional acknowledgement bits are added to packet transmissions. One is a current acknowledgment bit which indicates whether a packet was successfully received anytime during the current cycle. The second bit is a previous acknowledgment bit which indicates whether packets were received successfully anytime during the previous cycle.

A novel mechanism for constructing an adaptive hopping table (AHT) is disclosed that uses a greedy algorithm to choose frequencies with the best PER for transmission of higher priority packets, while equalizing the PER products across cycles. Unlike typical frequency hopping tables which aim to maximize the a priori frequency diversity without knowledge of the actual channel and interferer conditions, the AHT mechanism of the invention dynamically generates tables that optimize the probability of reception of high priority packets (e.g., PD packets). A minimal set of channels are selected from the available channels after static blacklisting. The channels selected are then tracked, maintaining long and short term statistics on each channel. The allocation of the channel frequencies to the subcycles in each cycle is optimized based their actual performance of the channels. Note that priority is not a part of the IOLW standard, only transmission of the PD packets are.

In addition, a last resort frequency mechanism further improves transmission success by having the master and device switch to a better performing channel for the last subcycle in a cycle when previous attempts to transmit a high priority packet have failed.

The mechanism of the invention is useful to improve wireless transmission performance in industrial environments which typically are characterized by (1) challenging fading channels including low coherence bandwidth caused by reflections and low coherence time; and interferers including other IO-Link networks, Bluetooth and wireless LAN, and electromagnetic noise generated by machinery.

The mechanisms of the present invention are particular useful in wireless networks such those operating under the IO-Link Wireless standard. The description of the invention is provided in the context of the IO-Link Wireless standard. It is appreciated, however, that the mechanisms of the invention are applicable to other wireless networks as well.

There is thus provided in accordance with the invention, a method of reliable communications between a master and a plurality of devices in a wireless communications network, comprising the master and/or at least one of the plurality of devices autonomously hopping to a last resort frequency channel for receipt of a high priority packet if a last subcycle of a cycle is reached and all previous high priority packet reception attempts were unsuccessful, and wherein both the master and the plurality of devices are configured a priori with the last resort frequency channel to be used to transmit high priority packets.

There is also provided in accordance with the invention, a method of reliable communications between a master and a plurality of devices in a wireless communications network, comprising the master and/or at least one of the plurality of devices autonomously hopping to a last resort frequency channel for transmission of a high priority packet if a last subcycle of a cycle is reached, high priority packet retransmissions have been attempted in previous subcycles, and all acknowledgements received as responses to the high priority packet retransmissions indicate unsuccessful transmissions, or if no acknowledgements are successfully received, and wherein both the master and the plurality of devices are configured a priori with the last resort frequency channel to be used to transmit high priority packets.

There is further provided in accordance with the invention, an apparatus for reliable communications between a master and a plurality of devices in a frequency hopping wireless communications network, comprising a frequency hopping radio transmitter, a frequency hopping radio receiver, a processor coupled to and operative to control the frequency hopping radio transmitter and the frequency hopping radio receiver, the processor programmed to autonomously hop to a last resort frequency channel for receipt of a high priority packet if a last subcycle of a cycle is reached and all previous high priority packet reception attempts were unsuccessful, and wherein both the master and the plurality of devices are configured a priori with a last resort frequency channel to be used to transmit high priority packets.

There is also provided in accordance with the invention, an apparatus for reliable communications between a master and a plurality of devices in a frequency hopping wireless communications network, comprising a frequency hopping radio transmitter, a frequency hopping radio receiver, a processor coupled to and operative to control the frequency hopping radio transmitter and the frequency hopping radio receiver, the processor programmed to autonomously hop to the last resort frequency channel for transmission of a high priority packet if a last subcycle of a cycle is reached, high priority packet retransmissions have been attempted in previous subcycles, and all acknowledgements received indicate unsuccessful transmissions, or if no acknowledgements are successfully received, and wherein both the master and the plurality of devices are configured a priori with a last resort frequency channel to be used to transmit high priority packets.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein:

FIG. 8 is a diagram illustrating a first example PD-in packet sequence during a cycle;

FIG. 9 is a diagram illustrating a second example PD-in packet sequence during a cycle;

FIG. 10 is a diagram illustrating example additional acknowledgement bits to be added to packet transmission in accordance with the present invention;

FIG. 21 is a diagram illustrating an example frequency hopping table;

FIG. 25A is a diagram illustrating an example channel frequency PER table in a second stage in the process of generating the channel frequency hopping table;

FIG. 25B is a diagram illustrating an example channel frequencies table in a second stage in the process of generating the channel frequency hopping table;

FIG. 25C is a diagram illustrating an example cycle PER table in a second stage in the process of generating the channel frequency hopping table;

FIG. 26A is a diagram illustrating an example channel frequency PER table in a third stage in the process of generating the channel frequency hopping table;

FIG. 26B is a diagram illustrating an example channel frequencies table in a third stage in the process of generating the channel frequency hopping table;

FIG. 26C is a diagram illustrating an example cycle PER table in a third stage in the process of generating the channel frequency hopping table;

DETAILED DESCRIPTION

Figure 1:
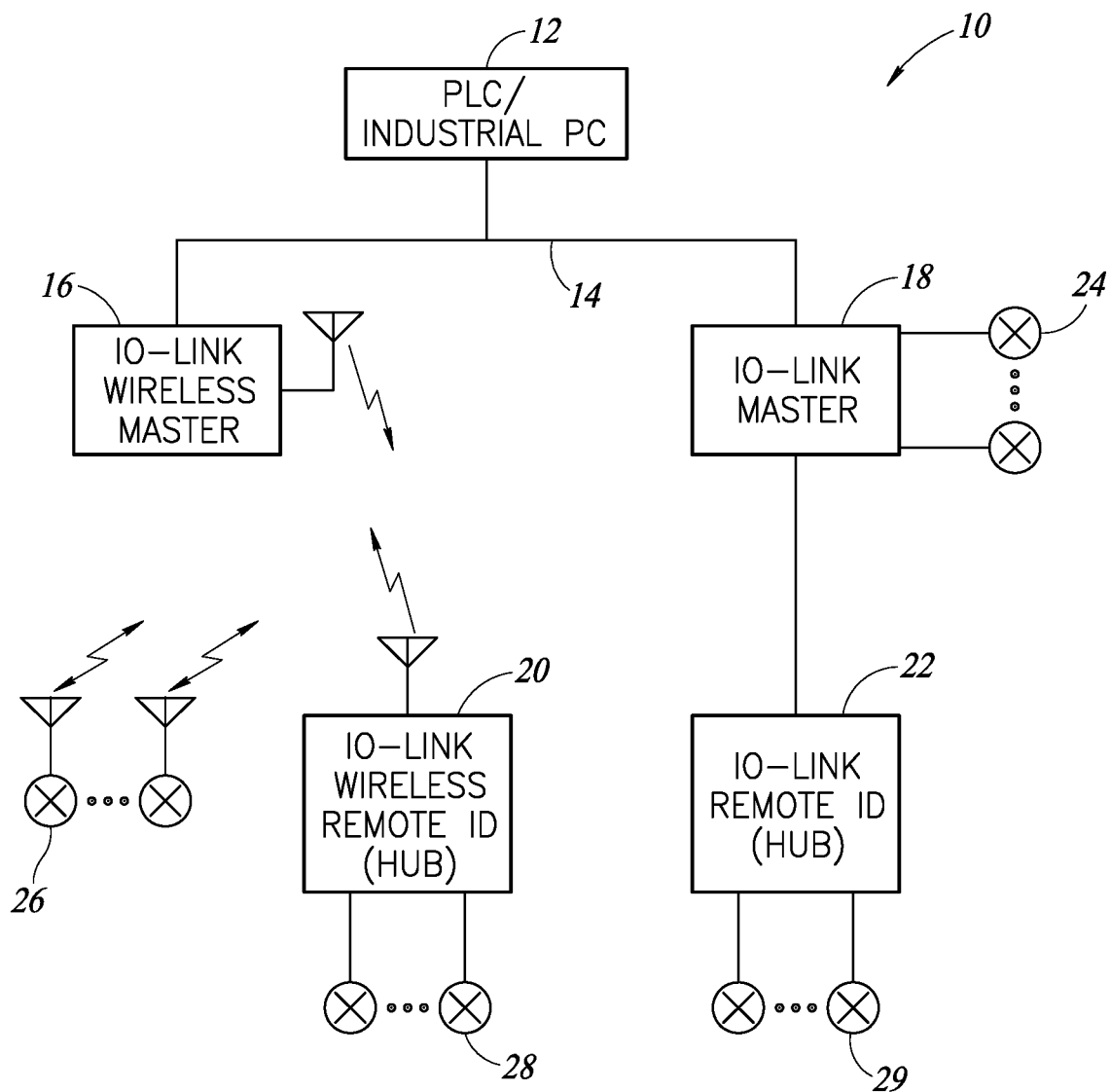
FIG. 1 is a high level block diagram illustrating an example IO-Link system including wired and wireless components.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++, C # or the like, conventional procedural programming languages, such as the "C" programming language, and functional programming languages such as Prolog and Lisp, machine code, assembler or any other suitable programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network using any type of network protocol, including for example a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention is operational with numerous general purpose or special purpose computing system environments or configurations. Examples of well-known computing systems, environments, and/or configurations that may be suitable for use with the invention include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

In addition, the invention is operational in systems incorporating sensors such as found in automated factories, in mobile devices such as tablets and smartphones, smart meters installed in the power grid and control systems for robot networks. In general, any computation device that can host an agent can be used to implement the present invention.

A high level block diagram illustrating an example IO-Link system including wired and wireless components is shown in FIG. 1. The example system, generally referenced 10, comprises a programmable logic controller (PLC) or industrial PC 12 coupled to an IO-Link master 18 and IO-Link Wireless master 16. The wireless master can be coupled wirelessly to a plurality of devices 26, and/or a wireless remote ID hub 20 which couples a number of remote devices 28 to the network. The wired master 18 couples a plurality of devices 24 to the network and may be coupled to a remote ID hub 22 which couples a number of remote devices 29 to the network.

It is appreciated that although the invention is described in the context of the IO-Link standard, the mechanism described here are applicable to other wireless systems as well. It is not intended that the invention be limited to the IO-Link standard example described herein.

Industrial systems use direct individual connections between a controller, e.g., PLC, and each component of the system. The control signal is transmitted using an analog or a digital signal sent over individual cables. A critical mission link system has a master 16, 18 connected to the PLC 12 and configured to communicate with multiple industrial devices (i.e. components) 24, 26, 28, 29. Typically, the master is configured to connect to multiple devices, such as actuators, sensors, and the like. The sensors may include smart sensors that are able to provide valuable diagnostic information as well as updated status reports. The master provides a centralized approach, with a single master connected to many components.

A standardized protocol, such as IO-Link®, is an example of such a system. The wireless IO-Link® (IOLW) standard, serving as a critical mission wireless link (CMWL) system, has been developed. The IOLW standard implements a critical mission link system over wireless communication, obviating the need for wires. The IOLW standard defines a time division multiplexing (TDM) uplink network configured to communicate with multiple devices. The master downlink comprises a broadcast message (i.e. one message sent for all devices) while multiple devices and components use a synchronous (i.e. by an external clock) TDM mechanism for uplink.

Figure 2:
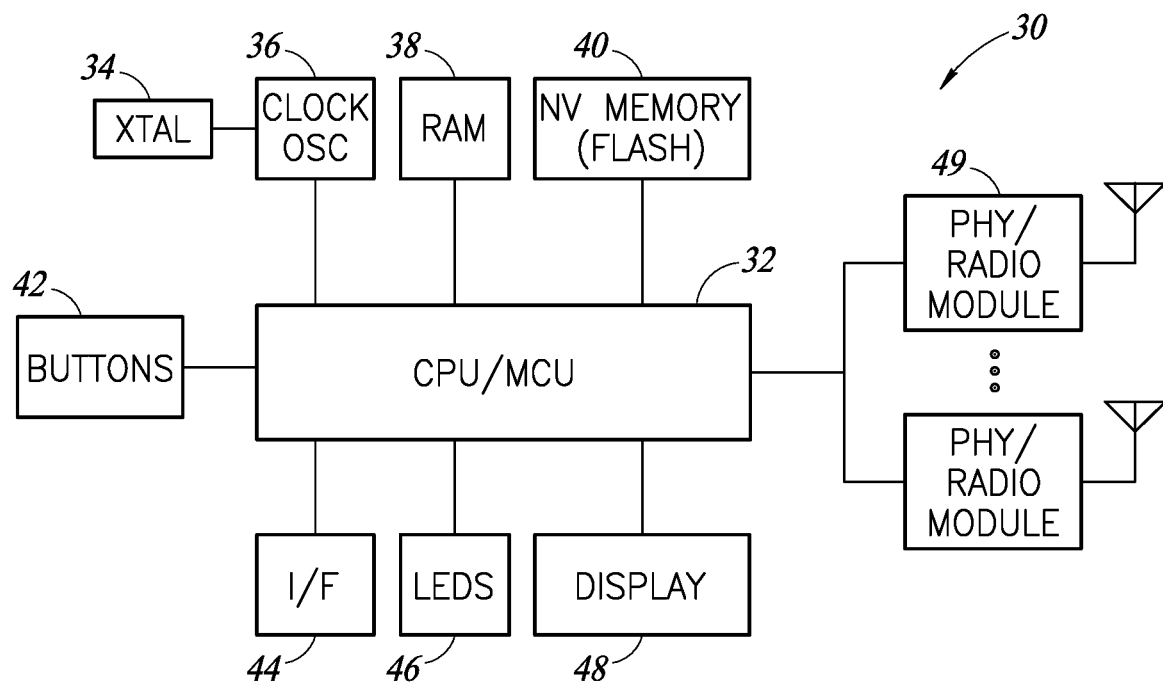
FIG. 2 is a high level block diagram illustrating an example master.

A high level block diagram illustrating an example master is shown in FIG. 2. The master, generally referenced 30, comprises a central processing unit (CPU)/microcontroller unit (MPU) 32, volatile memory, e.g., RAM, 38, nonvolatile memory, e.g., Flash, 40, crystal 34, clock oscillator 36, display 48, LEDs 46, interface 44, one or more buttons 42, and a plurality of PHY/radio modules 49.

Figure 3:
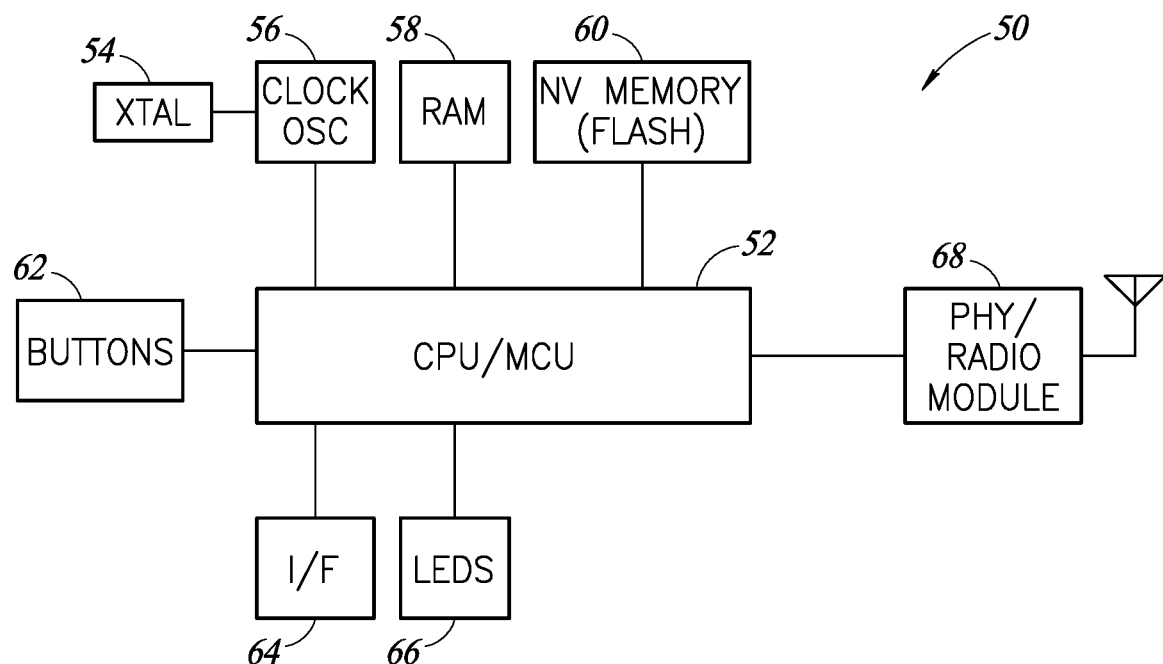
FIG. 3 is a high level block diagram illustrating an example device.

A high level block diagram illustrating an example device is shown in FIG. 3. The device, generally referenced 50, comprises a central processing unit (CPU)/microcontroller unit (MPU) 52, volatile memory, e.g., RAM, 58, nonvolatile memory, e.g., Flash, 60, crystal 54, clock oscillator 56, LEDs 66, interface 64, one or more buttons 62, and PHY/radio module 68.

Figure 4:
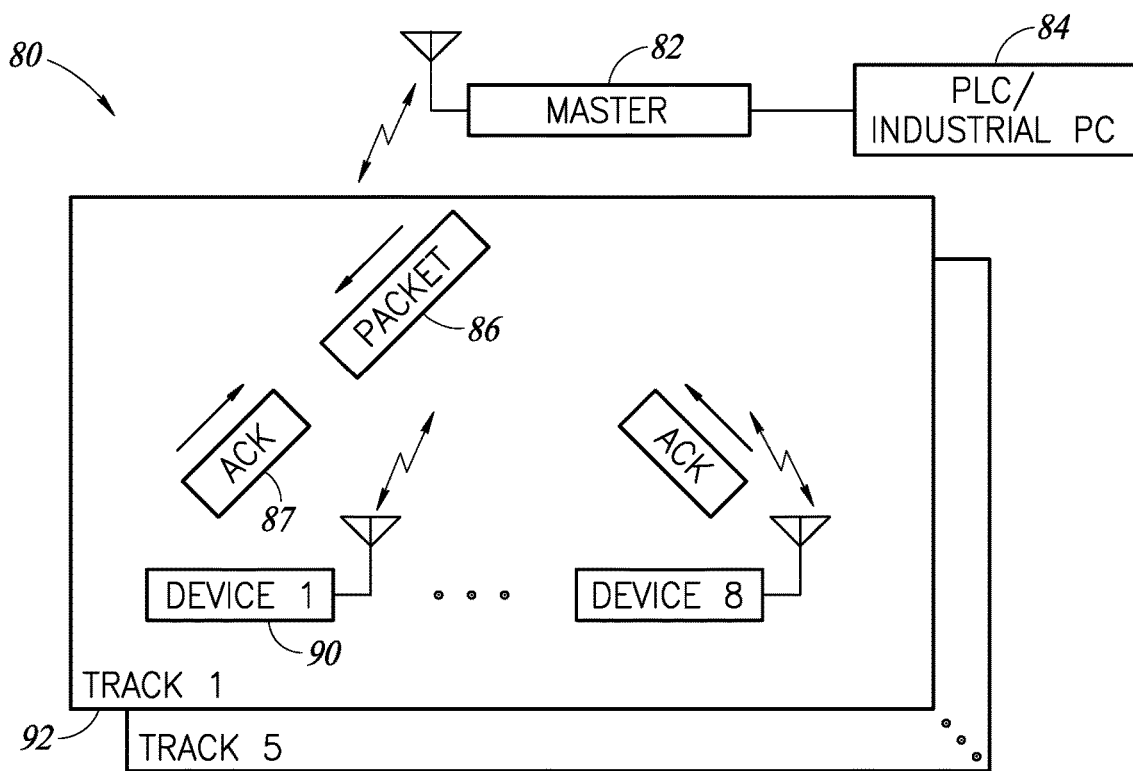
FIG. 4 is a diagram illustrating example communications between a master and several devices.

A diagram illustrating example communications between a master and several devices is shown in FIG. 4. The system, generally referenced 80, comprises a master 82 coupled to a PLC/industrial PC 84 and in communication with a plurality of devices 90 divided into multiple tracks 92. In the IO-Link Wireless system, each master may communicate with up to five tracks of devices, where each track has up to eight devices. Devices and masters transmit packets 86 between each other over downlinks and uplinks. An acknowledgement (ACK) negative acknowledgement (NACK) is generated and sent for each packet. Note that the master has a radio per track (i.e. up to five), each radio used to communicate over one of the tracks.

In operation, the master communicates with the devices over multiple tracks. Each track operates in a star topology, i.e. one master to many devices. The master comprises one dedicated transceiver (not shown) per track (for a total of five) and each device has a dedicated transceiver (not shown). While the master supports multiple tracks, the devices are limited to a single track. The tracks run simultaneously and are generally separated by frequency division multiplexing (FDM) frequency tables, defined a priori. For uplink communications from the devices to the master, each track operates its own TDM scheme while hopping a unique frequency table. When any of devices sends a unicast uplink message, the master is configured to receive and process the message. For downlink communications, the master communicates with the devices via multicast messaging. At a given time as defined by the standard, all device transceivers are configured to receive the multicast message transmitted by the master transceiver (per track).

Figure 5:
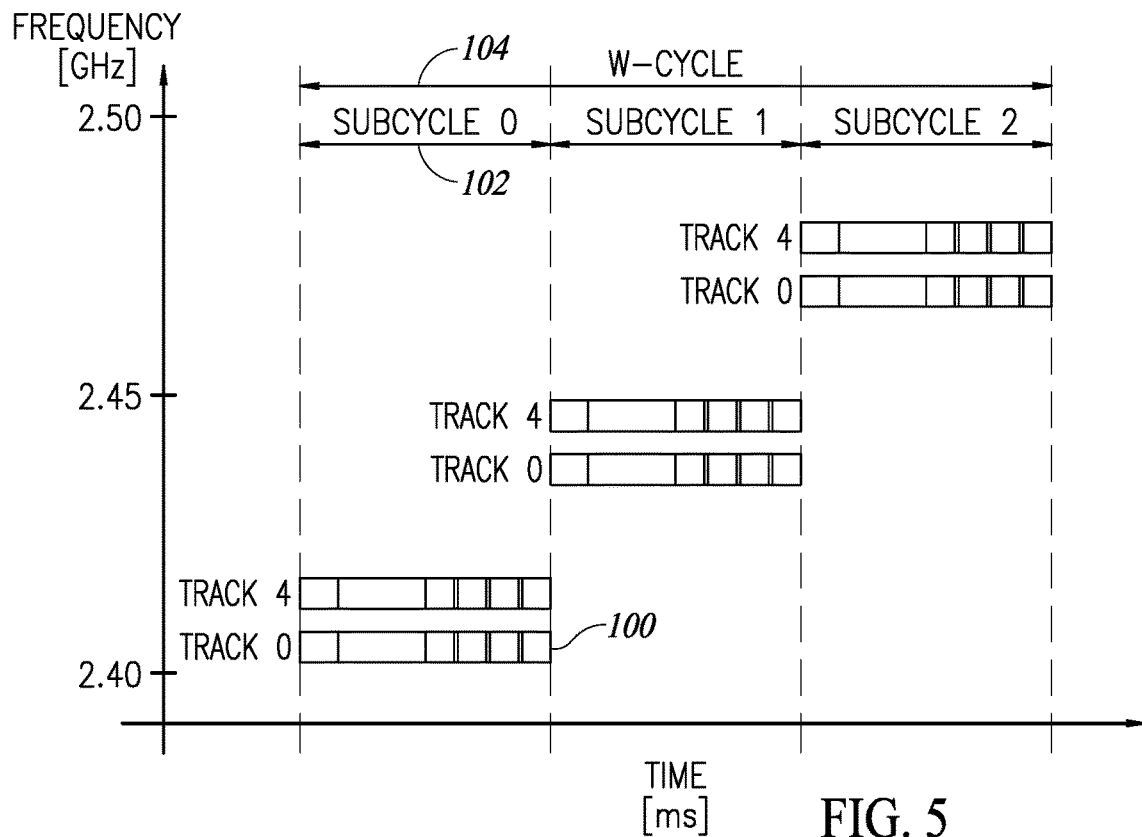
FIG. 5 is a diagram illustrating an example frequency plot for transmissions between master and devices.

A diagram illustrating an example frequency plot for transmissions between master and devices is shown in FIG. 5. The spectrogram shown is the transmission cadence according to the IOLW standard. The x-axis signifies time in msec and the y-axis signifies the frequency in GHz. The spectrum band over which the IOLW standard communicates is the Industrial, Scientific and Medical (ISM) band from 2.4 to 2.5 GHz.

The transmission cadence is divided into cycles (referred to as W-Cycles in the IOLW standard) 104 with varying durations. In this example, each cycle has a length of 5 msec. Each cycle is divided into a plurality of subcycles 102 of fixed duration. In this example, each cycle is divided into three subcycles of 1.66 msec each. Note that cycles may be divided into three or more subcycles.

According to a sequence known a priori to master and devices, each track within each subcycle is assigned a nonoverlapping frequency on which its members transmit and receive. In this example, track 0 and track 4 are shown. In the first subcycle 0, track 0 packets 100 are transmitted on frequency 2.404 GHz, while track 4 packets are transmitted on 2.412 GHz. This FDM scheme along with time synchronization between the tracks prevents the tracks from overlapping in the frequency domain and allows simultaneous transmission. Within each track, the various members (i.e. master track and associated devices) obey a TDM regime, in which, only one member transmits at any given time. In subcycle 1, track 0 packets are transmitted at 2.43 GHz and track 4 packets are transmitted at 2.47 GHz. In subcycle 2, track 0 packets are transmitted over the center frequency 2.46 GHz while track 4 packets are transmitted over the center frequency of 2.472 GHz.

Figure 6:
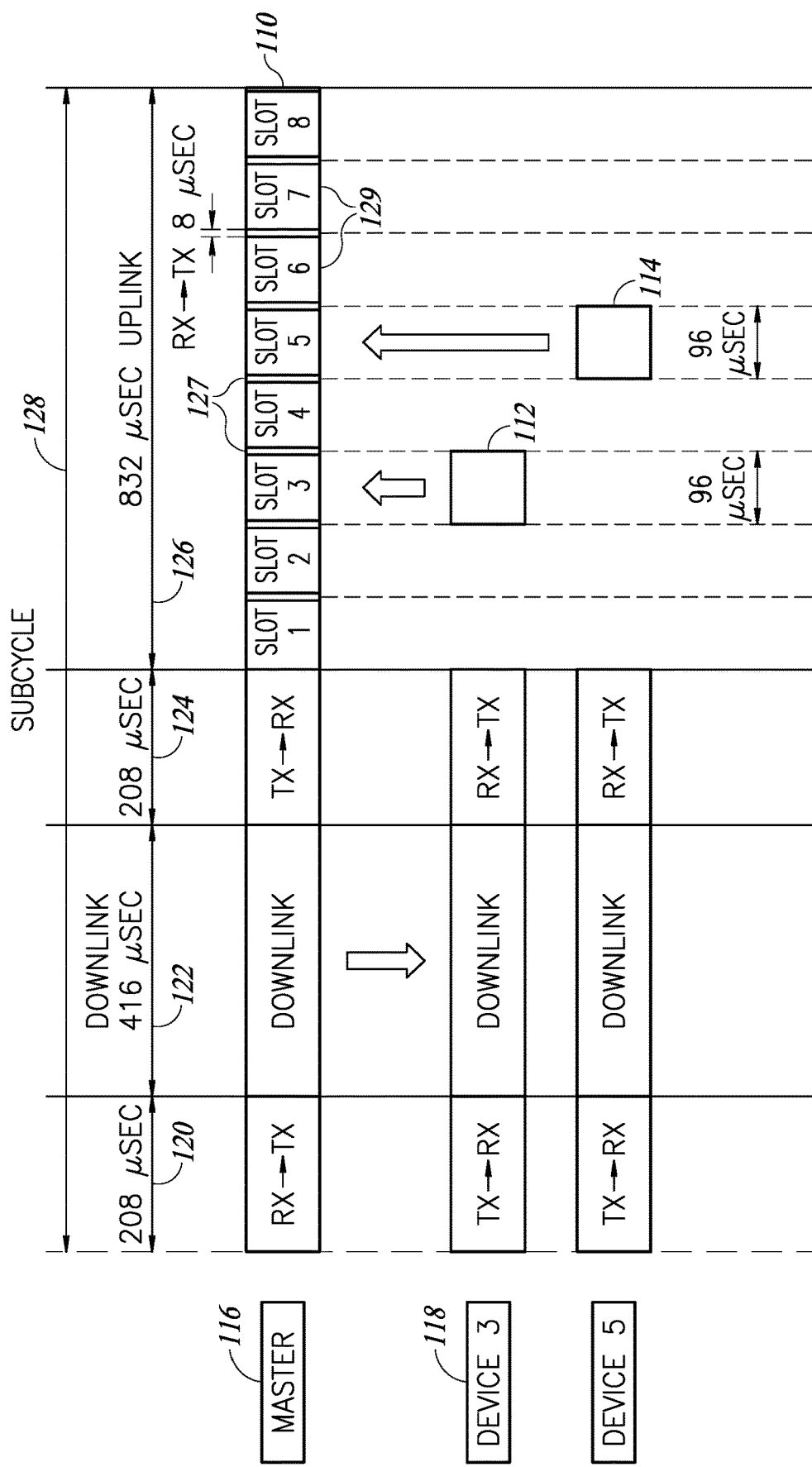
FIG. 6 is a diagram illustrating the packet structure in more detail.

A diagram illustrating the packet structure of a single subcycle in the TDM regime in more detail is shown in FIG. 6. The subcycle 128 is a structured transmit receive system between a master 116 and multiple devices 118, e.g., devices 3 and 5, operating over a single track. The subcycle comprises a 208 µsec guard time 120, in which the master switches its transceiver from receive (RX) to transmit (TX) mode (from the previous subcycle) and devices 118 switch their transceivers from TX to RX (from the previous subcycle). This is followed by a 416 µsec downlink window 122, in which the master transmits a downlink multicast message to the devices.

The system then goes into a 208 µsec guard time 124 in which the master switches its transceiver form TX to RX and the devices switch from RX to TX. This is followed by an 832 µsec uplink window 126 during which eight 96 µs consecutive time slots 129 are provided for the devices to transmit their uplink information to the master in messages 112, 114. The slots are padded with 8 µs guard times 127 to allow the master to reset its transceiver and move from RX (last packet) to RX (new packet). Note that the entire subcycle is conducted over a single FDM frequency that hops from subcycle to subcycle.

The IO-Link Wireless (IOLW) standard defines two relevant data types:

1. Cyclic Process Data (PD) which is high priority and the most critical type of data that needs to be sent and received robustly and quickly periodically. For sensors, the PD holds the sensed parameter data. For actuators the PD holds the control information for controlling the actuator.

2. On-Demand Data (OD) which consists of cyclical device data or events. This data is low priority and second in priority to PD.

The IOLW standard defines two scenarios of PD packets. (1) PD-out where PD data is sent from a master to a device (e.g., downlink for actuators), and (2) PD-in where PD data is sent from a device to a master (e.g., uplink for sensors).

Figure 7:
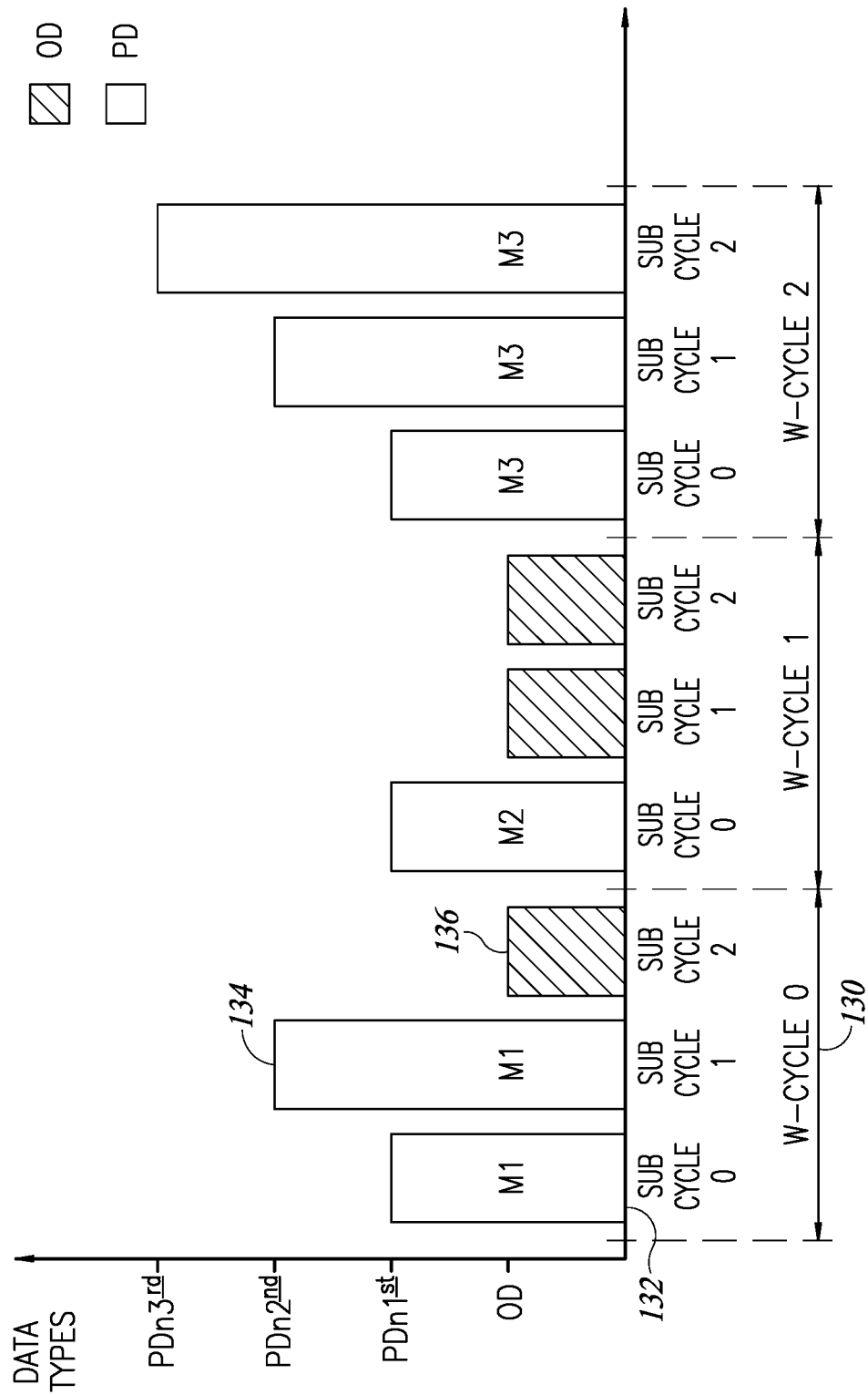
FIG. 7 is a diagram illustrating example transmission and retransmission of data types over several cycles.

A diagram illustrating example transmission and retransmission of data types over several cycles is shown in FIG. 7. The diagram shows the partitioning of data types within the cycles of an IOLW system having three subcycles per cycle 130. The y-axis shows the data type, while the x-axis shows the time divided into three cycles, namely cycles 0, 1, and 2. In this partitioning, in each cycle the system first attempts to transmit the critical PD data and only if it can verify that this data has been successfully received, it then attempts to transmit the noncritical OD data.

In cycle 0, a first attempt to transmit a high priority PD packet (measurement M1) PDn_$1^{st}$ 132 is made. It is unsuccessful and a retransmission PDn_$2^{nd}$ 134 of the PD packet is attempted. The retransmission is successful and the system then transmits low priority OD packet 136.

In cycle 1, the system first attempts to transmit a PD packet (measurement M2) PDn_$1^{st}$. After acknowledgement of its successful reception two OD packets are transmitted.

In cycle 2, the system transmits a PD packet (measurement M3) PDn_$1^{st}$ which is unsuccessful. It attempts two retransmissions of PDn_$2^{nd}$ and PDn_$3^{rd}$. Note that it is evident that there is no air time left for transmitting non-critical OD data.

A diagram illustrating a first example PD-in message or packet sequence during a cycle is shown in FIG. 8. In this scenario a cycle error event is generated even though successful transmissions of the PD have occurred. The system is able to detect an incorrect message using a strong 32-bit cyclic redundancy check (CRC) code embedded within each message. A successful reception of a message is denoted by a check mark '✓'. An unsuccessful reception of a message is denoted by an 'X'. A PD transmission is considered successful only if it has been successfully received by its recipient and its acknowledgment (ACK) is also successfully received by the sender. The sender knows positively that the PD transmission has been successfully received by the recipient. This is implemented using a returning ack from the PD recipient to its sender. Note that uplink messages from device to master also contain an ACK or NACK message regarding the previous downlink message. If one of these conditions is not met, a cycle error event is declared and sent by the PD sender to the recipient in higher protocol layers.

Consider a messaging scenario 140 over a channel with severe fading and interference between a master 142 and a device 144. In a fading channel scenario, the channel and reciprocal channel suffer from severe attenuation (e.g., a null of 90 dB) causing both master and device to not be able to receive any packets during the subcycle.

In this example, the cycle comprises three subcycles (SC)146: SC0, SC1, and SC2 with corresponding transmission frequencies $f_0$, $f_1$ and $f_2$, respectively. In this scenario, SC0 and SC2 with frequencies $f_0$ and $f_2$, respectively, have been blanked due to severe fading or an active interferer such as Bluetooth or Bluetooth Low Energy (BLE).

In the first subcycle SC0, the first transmission 148 between master and device is an ACK resulting from a previous cycle. The system starts off by sending a first PD transmission PD1 $1^{st}$ attempt and a NACK 150 because transmission 148 was not received correctly. Due to severe fading in SC), the master fails to receive message 150 as indicated by 'X'.

In the second subcycle SC1, the master sends a NACK 152, which is received correctly by the device, indicated by a '✓'. Since the device received a NACK, it proceeds to retransmit the PD data in message 154. This message is received correctly as indicated by the J.

In the third subcycle SC2, the master sends an ACK in message 156 but due to blanking in SC2 it is not received by the device as indicated by the 'X'. At this stage, because the device never correctly received an ACK message it proceeds to make a $3^{rd}$ attempt of the PD transmission in message 158. The master, however, fails to receive this message again due to the blanking in SC2 as indicated by 'X'.

In the subsequent cycle SC0, the master transmits a NACK 160 in the first SC of the next cycle and this transmission is received successfully. In response, the device marks this as a cycle error event, since the PD sender (i.e. the device in this case) does not know positively that the recipient (i.e. the master) has successfully received any of the PD transmissions.

Thus, the typical scenario depicted in FIG. 8 shows blanking in two subcycles out of three and although the master has received the PD successfully, it has not been able to convey this information to the device. Therefore, the system declares a cycle error event, which means that there is no conclusive proof by the PD sender that the PD packet has been successfully transmitted to its recipient. To make things worse, some messages have actually been received successfully by the device, namely messages 152 and 160 but the information transmitted in them was unfortunately NACKs.

A diagram illustrating a second example PD-in packet sequence during a cycle is shown in FIG. 9. This figure depicts another messaging scenario 170 between a master 172 and a device 174. The cycle comprises three subcycles (SC) 176: SC0, SC1, and SC2 with corresponding transmission frequencies $f_0$, $f_1$ and $f_2$, respectively. In this scenario, SC1 and SC2 with frequencies $f_1$ and $f_2$, respectively, have been blanked due to severe fading.

In the first subcycle SC0, the first transmission 178 between master and device is an ACK resulting from a previous cycle. The device then sends the first PD packet and ACK in message 180. This message is received correctly by the master as indicated by the '✓' sign.

In the second subcycle SC1, to indicate successful reception, the master sends an ACK message 182 but the device fails to receive this message due to the severe fading in SC1, as indicated by the 'X'. Since the device does not know what was in message 182 it assumes that it was a NACK and performs a retransmission of the PD packet in message 184. Again due to the blanking in SC1, the master fails to receive this message as indicated by the 'X'.

In the third subcycle SC2, the master sends a NACK transmission to the device in message 186. The device fails to receive this message due to the blanking in SC2. The device then proceeds to send a $3^{rd}$ PD transmission message 188, which fails to be received by the master as indicated by 'X'.

In the first subcycle SC0 of the next cycle, the master sends another NACK message 190 in the next cycle indicating it did not receive the last message correctly. The device successfully receives the NACK and in response declares a cycle event in accordance with the IOLW standard.

Thus, although the master has received the first PD retransmission 180 correctly, it fails to convey this information to the device, which continues to retransmit the PD and a cycle error event is declared.

This is an inherent drawback of some MCWL systems such as the IOLW protocol. Even though frequency diversity is introduced through hopping, both the actual PD message and the ACK to the device (in the PD-in case) need to be correctly received and decoded in order to prevent a cycle error. Since the information is divided into subcycles, however, each one with its own carrier frequency, there is a correlation between the success or failure of some subsequent messages and independence of others (e.g., the PD transmission in SC0 and the ACK transmission in SC1) causing events such as shown in FIGS. 8 and 9. Although OD packets are not considered by the IOLW standard to be "critical data," it sometimes contains control information and telemetry used by the system to perform important tasks (e.g., automatic frequency hopping). Having the transmission of OD packets contingent upon the success of both PD transmission and ACK reply diminishes the OD throughput significantly and can adversely impact system performance.

Enhanced Acknowledgement Mechanism

A diagram illustrating example additional acknowledgement bits to be added to packet transmission in accordance with the present invention is shown in FIG. 10. To overcome the drawbacks of the IOLW standard, two additional acknowledgement bits are introduced. One bit is a current acknowledgment bit for high priority packets (e.g., PD packets) denoted PD_ACK_CUR 200 which indicates whether the PD packet was received successfully anytime during the current cycle. It is set by the successful receipt of the PD packet and stays set for the duration of the cycle.

The second bit is a previous acknowledgment bit for high priority packets (e.g., PD packets) denoted PD_ACK_PREV 202 which indicates whether the PD packet was received successfully anytime during the previous cycle. This bit is simply a copy of the PD_ACK_CUR from the previous cycle. At the end of each cycle, the value of PD_ACK_PREV is set to the value of PD_ACK_CUR and PD_ACK_CUR is reset.

Figure 11:
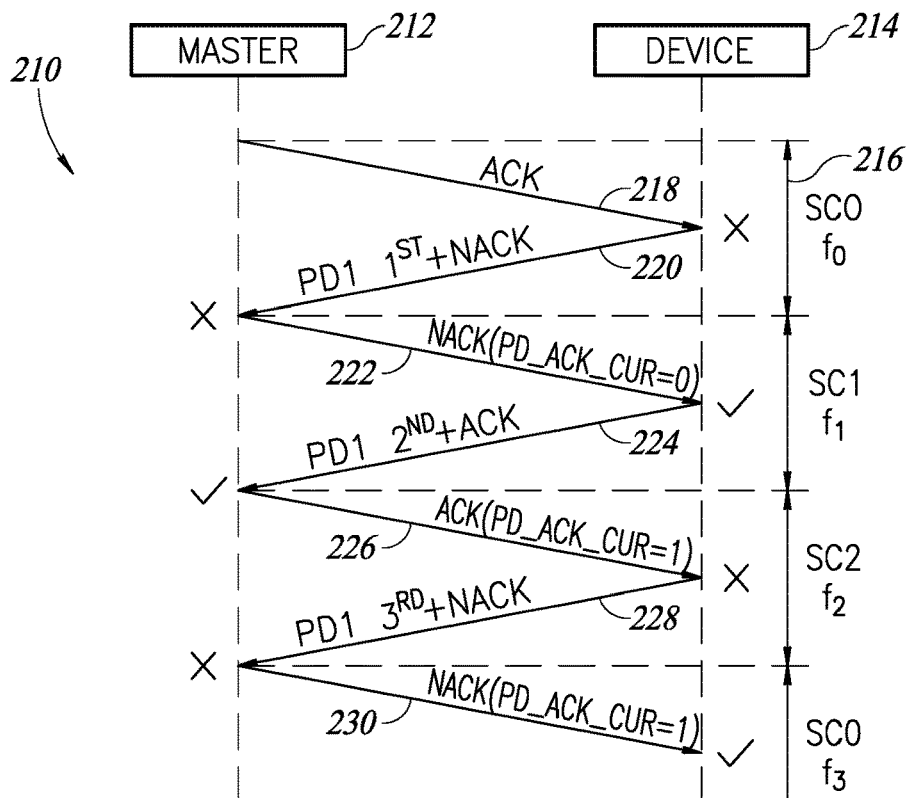
FIG. 11 is a diagram illustrating a first example PD-in packet sequence during a cycle using the acknowledgment mechanism of the present invention.

A diagram illustrating a first example PD-in packet sequence during a cycle using the acknowledgment mechanism of the present invention is shown in FIG. 11. A messaging scenario 210 is shown between a master 212 and a device 214 with three subcycles per cycle for a PD-in scenario. The cycle comprises three subcycles (SC) 216: SC0, SC1, and SC2 with transmission frequencies $f_0$, $f_1$ and $f_2$, respectively. SC0 of the next cycle and the first transmission thereof are also shown.

In this scenario, SC0 and SC2 with frequencies $f_0$ and $f_2$, respectively, have been blanked due to severe fading or an active interferer such as Bluetooth or Bluetooth Low Energy (BLE). The first transmission 218 between master and device is an ACK resulting from a previous cycle. In the first subcycle SC0, an ACK message 218 from the previous cycle is sent at the beginning of SC0. The device then sends a first transmission attempt of PD and NACK in message 220. This message is not received correctly by the master due to the blanking conditions of SC0 as indicated by 'X'.

In the second subcycle SC1, the master attempts to send a NACK message 222. In one embodiment, an extra bit, namely PD_ACK_CUR, set to '0' is affixed to the message signaling that the PD was not successfully received by the master in any of the previous subcycles within the current cycle. In one embodiment, the affixing process can be implemented by lengthening the packet and appending the PD_ACK_CUR bit or replacing any of the existing protocol bits within the packet with it. Both the master and device are mutually cognizant of the format and meaning of the PD_ACK_CUR bit.

In message 222, the PD_ACK_CUR is de-asserted (i.e. set to '0') since no successful PD reception has been recorded by the master during the cycle thus far. Message 222 is received correctly by the device as indicated by '✓'. In response to the NACK with PD_ACK_CUR=0, the device transmits a second transmission of the PD in message 224 with ACK. This message is received correctly by the master as indicated by '✓'.

In the third subcycle SC2, since message 224 has been received correctly by the master, it sends an ACK message 226 with the PD_ACK_CUR bit asserted (i.e. set to '1'). Since SC2 suffers from blanking, message 226 is not decoded correctly by the device as indicated by 'X'. In response, the device then sends a third transmission of the PD data in message 228. Again, this message is not received correctly by the master as indicated by 'X'.

In the first subcycle SC0 of the next cycle, the master must now transmit a NACK in message 230 since it has not received message 228 correctly. The PD_ACK_CUR bit of message 230, however, is set to '1' due to a previous correct reception of the PD data in message 224.

Since message 230 is received correctly by the device, as indicated by '✓', the device knows positively that at least one of the PD retransmissions has been received correctly and the cycle is marked as successful and no cycle error is declared.

Thus, this acknowledgement mechanism has advantages over prior art MCWL protocols and the IOLW protocol in particular. Devices are able to transmit PD packets to masters even though two out of three subcycles are blanked and only a NACK message has been received correctly by a device. Both parties (i.e. master and device) know positively that the PD data has been received correctly. The scheme allows more attempts (depending on which PD retransmission has actually been received) at conveying the information about a successful reception to the PD sender than prior art protocols and therefore significantly increases the chance of cycle success.

Figure 12:
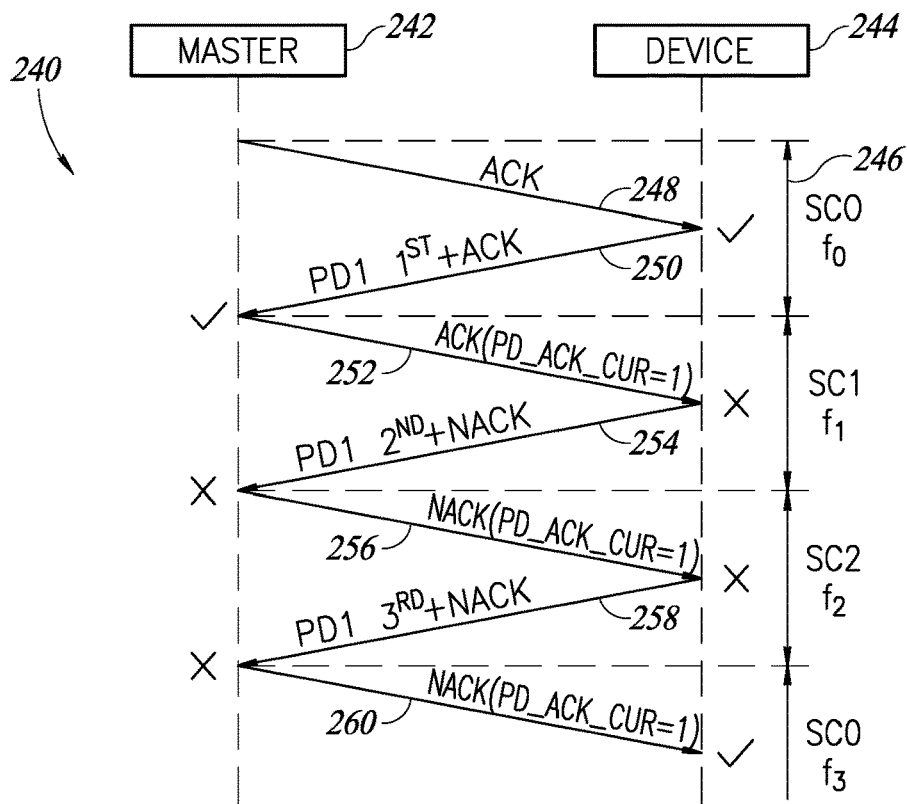
FIG. 12 is a diagram illustrating a second example PD-in packet sequence during a cycle using the acknowledgment mechanism of the present invention.

A diagram illustrating a second example PD-in packet sequence during a cycle using the acknowledgment mechanism of the present invention is shown in FIG. 12. A messaging scenario 240 is shown between a master 242 and a device 244 for the PD-in case. The cycle comprises three subcycles (SC) 246: SC0, SC1, and SC2 with transmission frequencies $f_0$, $f_1$ and $f_2$, respectively. SC0 of the next cycle and the first transmission thereof are also shown.

In the first subcycle SC0, the first transmission 248 between the master and the device is an ACK resulting from a previous cycle. The device then sends the first PD transmission in message 250. Message 250 is received correctly by the master as indicated by '✓'.

In the second subcycle SC1, to indicate successful reception, the master sends an ACK message 252. In accordance with the invention, an extra bit, namely PD_ACK_CUR, is affixed to the message signaling whether the PD has been successfully received by the master in any of the preceding subcycles within the last cycle. Note that in the PD-in case the first message is considered as part of the previous cycle for the PD_ACK_CUR. In one embodiment, The bit is added to the packet by lengthening the packet and appending the PD_ACK_CUR bit or by replacing any of the existing protocol bits within the packet. Both the master and device are cognizant of the format and meaning of the PD_ACK_CUR bit to the protocol. The PD_ACK_CUR bit in message 252 is asserted due to the fact that the first PD transmission in message 250 within the current cycle has been successfully received by the master.

The device, however, fails to receive message 252 as indicated by 'X'. Since the device does not know what was in message 252 it assumes that it was a NACK and performs a retransmission of the PD in message 254 with a NACK. Again, due to the blanking in SC 1, the master fails to receive this message as indicated by 'X'.

In the second subcycle SC2, this is followed by a NACK transmission 256 from the master to the device. Since at least one retransmission of the PD has been successfully received (in this case the first transmission in message 250) by the master within the cycle, the PD_ACK_CUR bit is set to '1'. The device fails to receive this message due to the blanking in SC2 as indicated by 'X'. The latter proceeds to send a third PD transmission message 258, which fails to be received by the master as indicated by 'X'.

In the first subcycle SC0 of the next cycle, the master then sends another NACK message 260, again with PD_ACK_CUR=1, in the next cycle indicating it has not received the last message correctly but successfully received a PD at some point within the cycle.

Since message 260 is received correctly, as indicated by '✓', the device knows positively that at least one of the PD transmissions has been received correctly and the cycle is marked as successful. This scenario is optimal for the PD_ACK_CUR reception. Since the first PD transmission in message 250 was successfully received by the master, the latter has three chances to "signal" this to the device (i.e. in messages 252, 256, and 260). This is done by asserting the PD_ACK_CUR bit in all messages from the master to the device, following the successful reception of message 250, even if the message transmitted is actually a NACK (indicating failure to receive the last message). Therefore, even in a very difficult channel condition scenario, the effective number of PD_ACK_CUR transmissions causes the cycle to be declared as successful thereby alleviating most of the problematic issues of prior art implementations.

Figure 13:
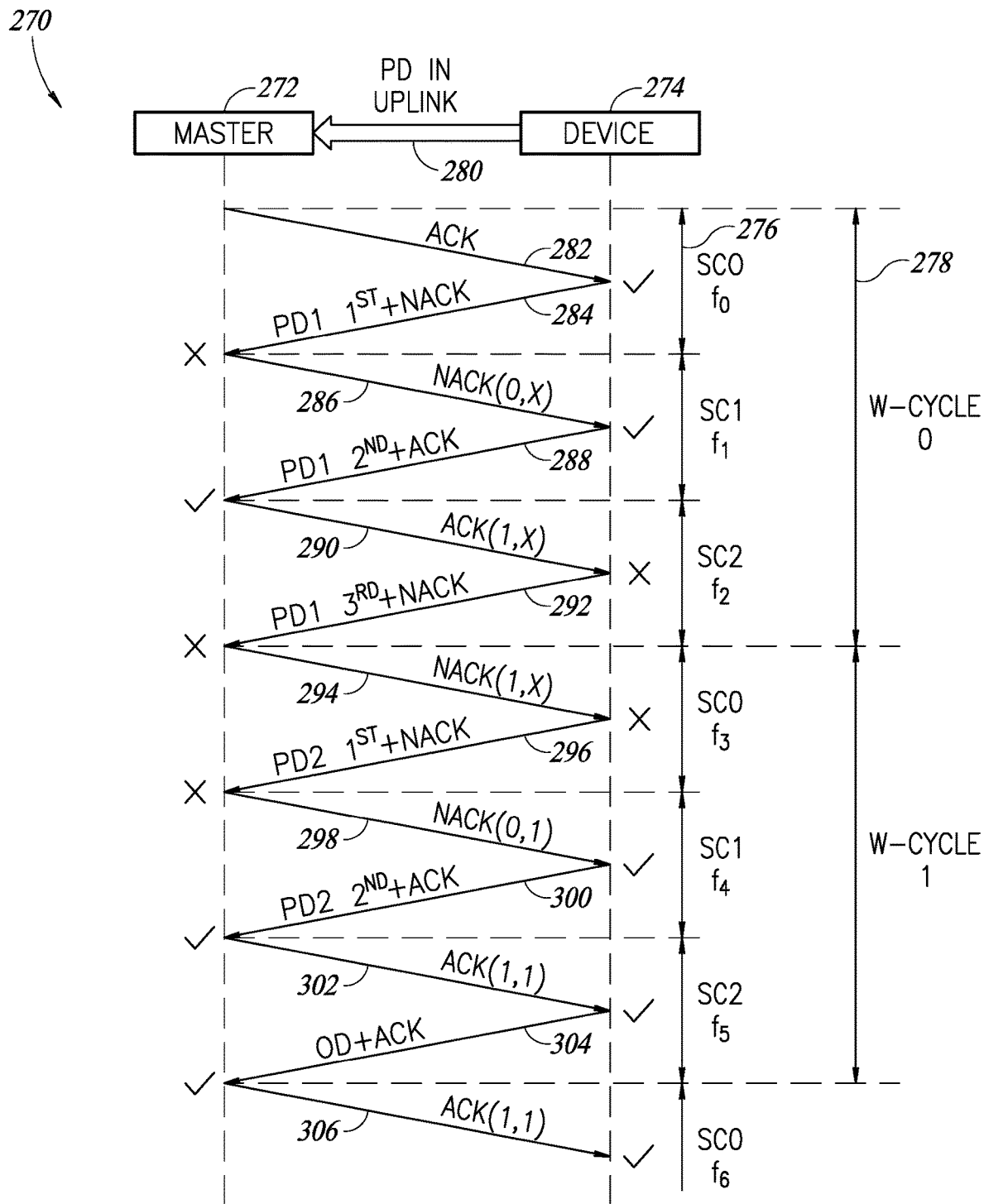
FIG. 13 is a diagram illustrating a third example PD-in packet sequence during a cycle using the acknowledgment mechanism of the present invention.

In the previous two example scenarios, only the PD_ACK_CUR bit was deployed. In another embodiment, both PD_ACK_CUR and PD_ACK_PREV bits are deployed to further improve performance. A diagram illustrating a third example PD-in packet sequence during a cycle using the acknowledgment mechanism of the present invention is shown in FIG. 13. The uplink (UL) messaging 270 between a master 272 and a device 274 is shown where the device sends data to the master. In this embodiment, two acknowledgement bits are affixed to each message: PD_ACK_CUR which indicates the success of any PD transmission in the current cycle, and PD_ACK_PREV which indicates the success of PD transmission in the previous cycle. Note that the 'X' symbol in the message indicates that the value in this field is irrelevant for this scenario. Please note that in the PD-in case the first transmission within a cycle is considered as part of the previous cycle for PD_ACK_CUR/PD_ACK_PREV purposes.

Note also that two consecutive cycles 278 (i.e. cycle 0 and 1) are shown for the PD-in case. The first cycle 0 comprises three subcycles (SC) 276: SC0, SC1, and SC2 with transmission frequencies $f_0$, $f_1$, and $f_2$, respectively. SC2 of cycle 0 is plagued with severe noise from fading or interference.

The second cycle (cycle 1) immediately follows cycle 0 and comprises three subcycles (SC): SC0, SC1, and SC2 with transmission frequencies $f_3$, $f_4$, and $f_5$, respectively. The first subcycle of the cycle subsequent cycle is also shown and allocated $f_6$.

In the first subcycle SC0 of the first cycle 0, an ACK transmission 282 associated with the previous cycle is sent. This ACK is successfully received by the device. The device then attempts to transmit the first transmission of the PD (marked PD1 for clarity) for cycle 0 in message 284. This message, however, is not successfully decoded by the master as indicated by 'X'. Please note that even in channels without extreme fading conditions a momentary interferer such as Bluetooth, Bluetooth Low Energy (BLE), or Wireless LAN (WLAN) might cause undesired noise and cause the receiver to fail.

In the second subcycle SC1 of cycle 0 the master proceeds to transmit a NACK message in message 286 following the unsuccessful decoding of message 284. The message is sent with PD_ACK_CUR=0 (i.e. no successful PD reception in this cycle) and a 'X' as PD_ACK_PREV (i.e. the previous cycle is irrelevant here). Message 286 is received correctly by the device as indicated by '✓'.

Since the device knows positively that the PD1 message 284 was not received successfully, it attempts to transmit a second transmission of the PD1 in message 288. This message is decoded successfully by the master as indicated by '✓'. The master must now try to convey the information about a successful PD reception to the device.

In the third subcycle SC2 of cycle 0 the master transmits an ACK message with PD_ACK_CUR=1 in message 290. This message is not received successfully due to fading conditions as marked by 'X'. Since the device did not receive message 290 successfully it now sends a third transmission of the PD in message 292. This message is also not received by the master as indicated by 'X'.

The device, however, does not know whether one of the PD1 transmissions has been successful in cycle 0 and proceeds to send a new PD message (PD2) 296 in cycle 1. The device tables the decision on whether to declare a cycle error in cycle 0. At this point in time cycle 0 is marked 'Pending' locally in the device.

In the first subcycle SC0 of cycle 1 the master sends a NACK message with PD_ACK_CUR=1 relating to the previous cycle in message 294. This is not received successfully by the device due to noise in the environment as marked by 'X'. At this point, the master resets PD_ACK_CUR to '0' and sets PC_ACK_PREV to '1' since this was the value of PD_ACK_CUR in the previous cycle.

The device, assuming that PD1 has been successfully received in cycle 0, sends a first transmission of PD2 in message 296. This is not received successfully by the master as marked by 'X'".

In the second subcycle SC1 of cycle 1 the master proceeds to send a NACK in message 298 due to the unsuccessful reception of message 296. The NACK is affixed with two bits: (1) PD_ACK_PREV=1 because PD1 was successfully received in previous cycle 0; and (2) PD_ACK_CUR=0 because all retransmissions of PD2 in cycle 1 have been unsuccessful so far. The device then transmits a second transmission of PD2 in message 300. This is received successfully as marked by '✓'.

In the third subcycle SC2 of cycle 1 the master sends an ACK message 302 due to the fact that previous message 300 has been received and decoded successfully. This message is affixed with PD_ACK_CUR=1 because PD2 has been successfully received in cycle 1, and PD_ACK_PREV=1 because PD1 has been successfully received in cycle 0. This message is received successfully as marked by '✓'.

The device now has complete information about the successful reception of the PD packet in both cycles 0 and 1 and can now move to transmit OD information in message 304. This is successfully decoded as indicated by '✓'.

In the first subcycle SC0 of the next cycle 2, the master now sends an ACK message in message 306 due to the successful reception of message 304. Message 306 is received successfully as indicated by '✓'. At this point the device marks both cycles 0 and 1 as successful and does not raise a cycle error event on any one of them.

It is noted that the major advantage of this mechanism is that the recipient of the PD messages (i.e. the master) in this case has multiple opportunities over a sliding window of two cycles to convey the information about successful PD reception. It therefore alleviates the need for an immediate response to be successful over a single subcycle and improves the protocol robustness significantly over prior art implementations.

It is appreciated that one skilled in the art may extend this scheme in multiple ways including lengthening the window of observation to multiple (N>2) cycles by affixing N bits of information on successful PD receptions in a sliding window of N cycles.

Figure 14:
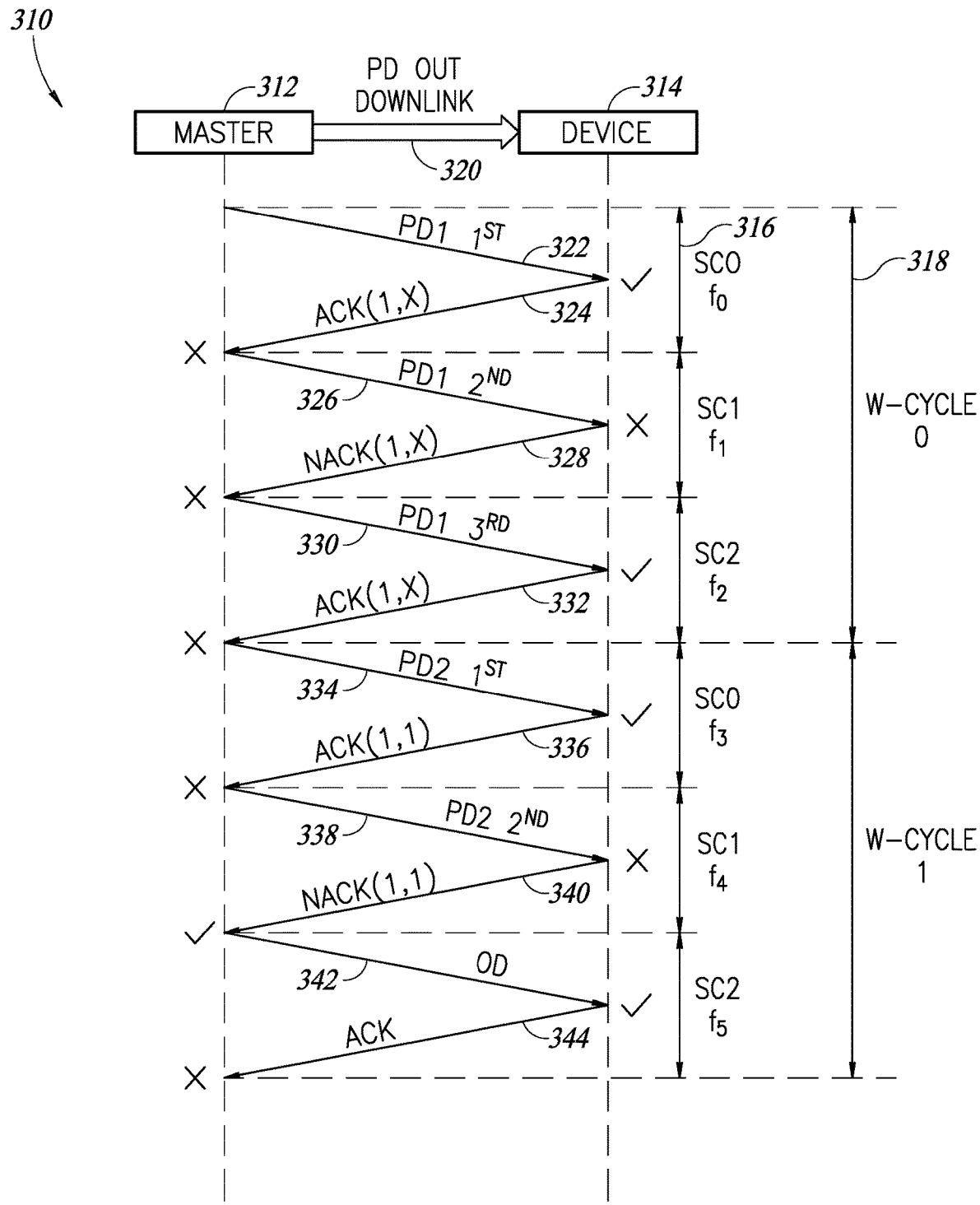
FIG. 14 is a diagram illustrating a first example PD-out packet sequence during a cycle using the acknowledgment mechanism of the present invention.

A diagram illustrating a first example PD-out packet sequence during a cycle using the acknowledgment mechanism of the present invention is shown in FIG. 14. The downlink (DL) messaging 310 shown between a master 312 and a device 314 is applied to a PD-out scenario (downlink) where the master sends PD data to the device and shows two consecutive cycles 318, cycles 0 and 1. Note that in the PD-out case, the SC starts immediately with a PD transmission rather with an ACK/NACK message as in the PD-in case. Cycle 0 comprises three subcycles 316, SC0, SC1, SC2 having center frequencies $f_0$, $f_1$, $f_2$ respectively.

In the first subcycle SC0 of the cycle 0 the master transmits a first PD packet PD1 in message 322. This message is received successfully as indicated by the '✓' symbol. The device then sends an ACK message 324 with PD_ACK_CUR=1/PD_ACK_PREV='X' bits affixed to it. The bits may be appended to the packet causing packet lengthening, or certain bits within the protocol may be replaced with these bits with knowledge of the protocol by both the master and device. Unfortunately, message 324 is not received successfully by the master as indicated by the 'X'.

In the second subcycle SC1 of cycle 0 the master then sends a second retry of the PD1 data in message 326, but this message is not received successfully by the device as indicated by 'X'. in response, the device sends a NACK message 328 with PD_ACK_CUR=1/PD_ACK_PREV='X' bits affixed thereto. This message is not received successfully by the master as indicated by the 'X'.

In the third subcycle SC2 of cycle 0, since the master is unaware that at least one of the PD transmissions has been received successfully, it attempts to send yet another third PD transmission in 330 and this is successfully received as indicated by the '✓'. In response, the device then sends an ACK message 332 with PD_ACK_CUR=1/PD_ACK_PREV='X'. This message, however, is not received successfully by the master as indicated by the 'X'.

Note that all uplink transmissions (i.e. the acknowledgements from device to master) have failed in cycle 0. This may be caused by an interferer which is physically close to the master such as a Wireless LAN Access Point and a Bluetooth device in close proximity.

Since the master is oblivious to the state of the PD receptions by the device it marks cycle 0 as 'Pending'. The final status of cycle 0 will therefore be determined by the master at the end of cycle 1. Cycle 1 comprises three subcycles SC0, SC1 and SC2 with transmissions and receptions over center frequencies $f_3$, $f_4$, and $f_5$ respectively.

In the first subcycle SC0 of cycle 1 the master makes a first transmission of the next PD packet PD2 in message 334. This message is received successfully by the device as indicated by the '✓'. In response, the device sends an ACK message 336 with both PD_ACK_CUR=1 and PD_ACK_PREV=1 due to the fact that at least one PD message in the current cycle 1 (PD2), and at least one PD message in the previous cycle 0 (PD1) have been successfully received, respectively. Unfortunately, this message is not received successfully as indicated by the 'X'.

In the second subcycle SC1 of cycle 1 the master sends a second PD2 transmission in message 338. This message is not received successfully by the device as indicated by 'X'. In response, the device sends a NACK message 340 with both PD_ACK_CUR and PD_ACK_PREV bits set to '1' due to the fact that at least one PD message in cycle 1 (PD2) and at least one PD message in cycle 0 (PD1) have been successfully received, respectively. This message is received successfully as indicated by the '✓'.

In the third subcycle SC2 of cycle 1 the master, despite receiving a NACK message 340 is now certain that PD1 and PD2 packets have been successfully received by the device in at least one transmission during cycles 0 and 1, respectively. It therefore proceeds to send an OD packet in message 342. This message is successfully received by the device as indicated by the '✓'. This is followed by an ACK message 344 from the device which fails to be received by the master as indicated by 'X'. Both cycles 0 and 1, however, are declared as success.

It is noted that despite numerous messages being lost due to a strong interferer near the master, the acknowledgement mechanism of the present invention is able to convey the information that at least one transmission of the PD packets PD1 and PD2 was successful. This is a significant advantage over prior art standards such as the IOLW and implementations thereof. Depending on which of the transmissions was received correctly, the device has between four and six PD_ACK_CUR/PD_ACK_PREV transmissions to convey this information. This is unlike prior art implementations which require that exactly the first ACK/NACK transmission after the successful PD reception be received successfully.

Figure 15:
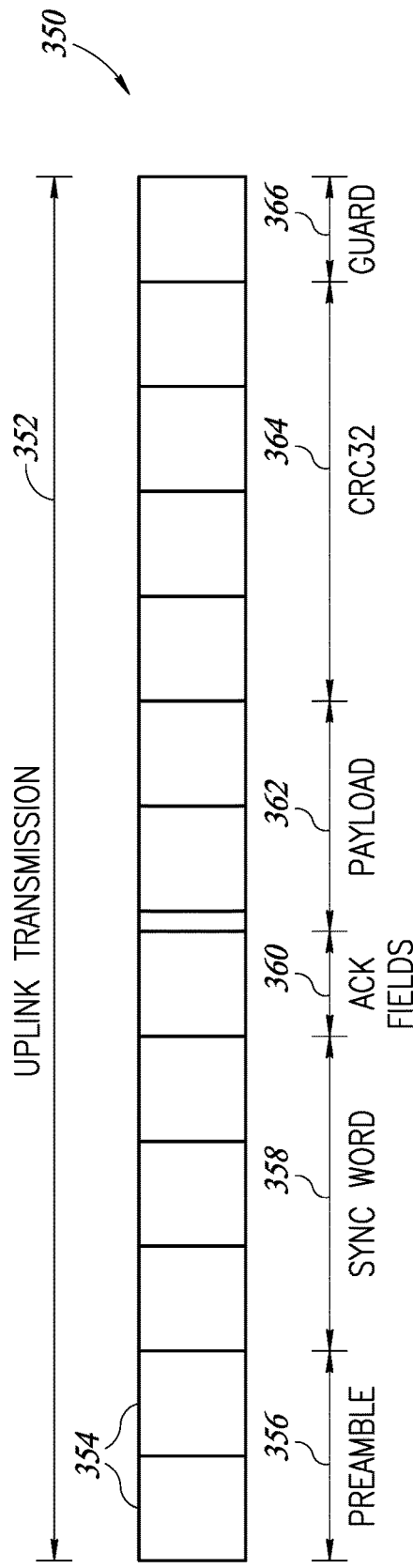
FIG. 15 is a diagram illustrating an example uplink transmission packet structure incorporating the acknowledgement bits of the present invention.

A diagram illustrating an example uplink transmission packet structure incorporating the acknowledgement bits of the present invention is shown in FIG. 15. The packet, generally referenced 350, modified from the IO-Link standard allows placing the PD_ACK_CUR and PD_ACK_PREV bits inside the packet without loss of functionality or lengthening of the packet.

In one embodiment, the packet 350 comprises a plurality of bytes arranged into fields including a 2-byte preamble 356 that helps the receiver start the decoding process, 3-byte sync word 358 that helps the receiver establish an exact starting position in time, 1-byte acknowledgement field 360 that includes the PD_ACK_CUR and PD_ACK_PREV bits, 2-byte payload 362, 4-byte CRC32 field 364, and a 1-byte guard field 366 allowing the receiver and transmitter to get ready for the next packet. Note that the acknowledgement field 360 is different from the IOLW standard, where this field originally contained a master ID unique to each master. The change can be made if all masters and devices are aware of the change.

To restore the functionality lost with the removal of the master ID field so that a receiving master can verify that it is the recipient of a UL message, the sync word 358 is modified to encode the master ID. Alternatively, the CRC32 machine can use a unique seed per master ID such that even an identical message with a different master destination will have a different CRC32 value. Note that this mechanism allows embedding both PD_ACK_CUR and PD_ACK_PREV bits by modifying the IOLW standard without lengthening the UL transmission format and packet structure.

Figure 16:
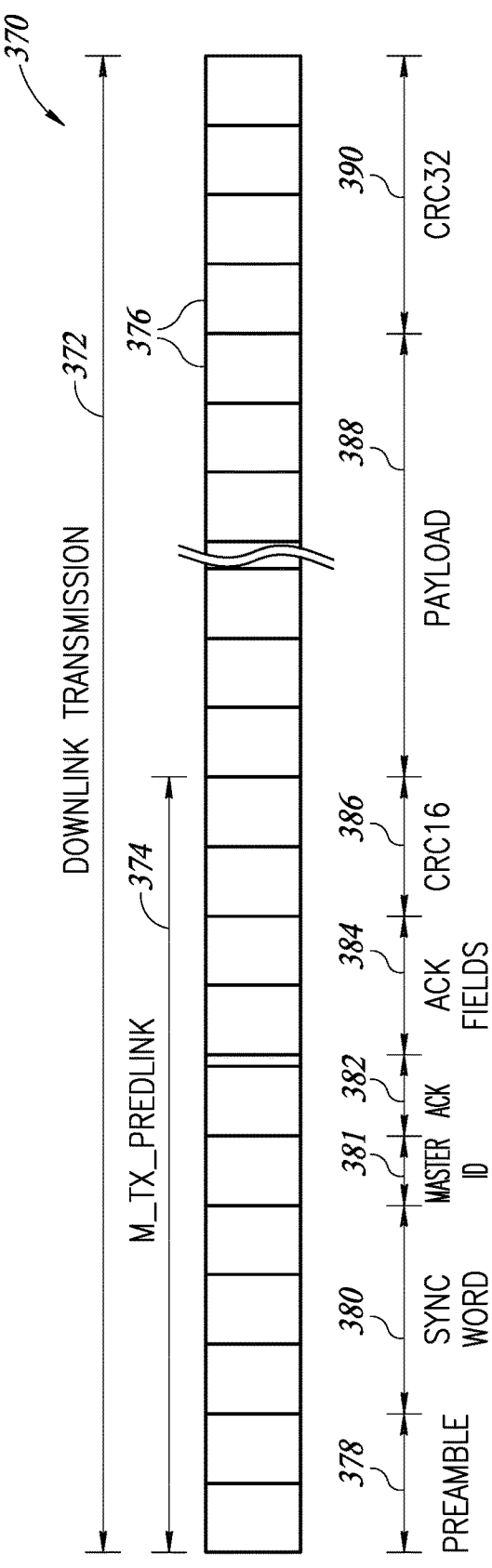
FIG. 16 is a diagram illustrating an example downlink transmission packet structure acknowledgement bits of the present invention.

A diagram illustrating an example downlink transmission packet structure acknowledgement bits of the present invention is shown in FIG. 16. The packet structure, generally referenced 370, of a down link packet is modified from the IO-Link standard whereby the PD_ACK_CUR and PD_ACK_PREV bits for each of eight devices in a track (16-bits total) are inserted inside the packet without lengthening the packet.

In one embodiment, the packet 370 comprises an initial portion M_TX_PreDlink 374 adapted to allow low power devices to shut down their operation if the payload information is not relevant to them. The M_TX_PreDLink comprises a 2-byte preamble field 378 to help the receiver start the decoding process, a 3-byte sync word 380 to help the receiver establish an exact starting position in time, a master ID 381 allowing the devices to verify that the transmission is coming from their paired master, an acknowledge byte 382 containing acknowledge bits for every device, a 2-byte acknowledgement field 384 containing 16 bits including PD_ACK_CUR/PD_ACK_PREV for each device on the network (up to eight devices), and a 2-byte CRC16 field 386 on the entire M_TX_PreDlink initial portion. Since the M_TX_PreDlink functionality has been aborted, the CRC16 field can be used for additional functionality (e.g., vendor specific codes) or as reserved bits.

The remainder of the downlink transmission 372 comprises multibit payload 388 for each device on the network and a 4-byte CRC32 field 390, which allows the recipients, i.e. devices, to verify their correct reception.

Note that the acknowledgement field 384 is modified from the IOLW standard effectively disabling the Low Power Device capability to shut down after the M_TX_PreDlink 374 reception if information is not available for it. Note further that if both devices and masters are configured with this change, then the network is coherent and although this specific low power capability is disabled, the advantages of this embodiment are significant for PD transmission and ACK reception success. Thus, without lengthening the packet, the present invention provides a mechanism to insert PD_ACK_CUR and PD_ACK_PREV bits into the downlink transmission.

Figure 17:
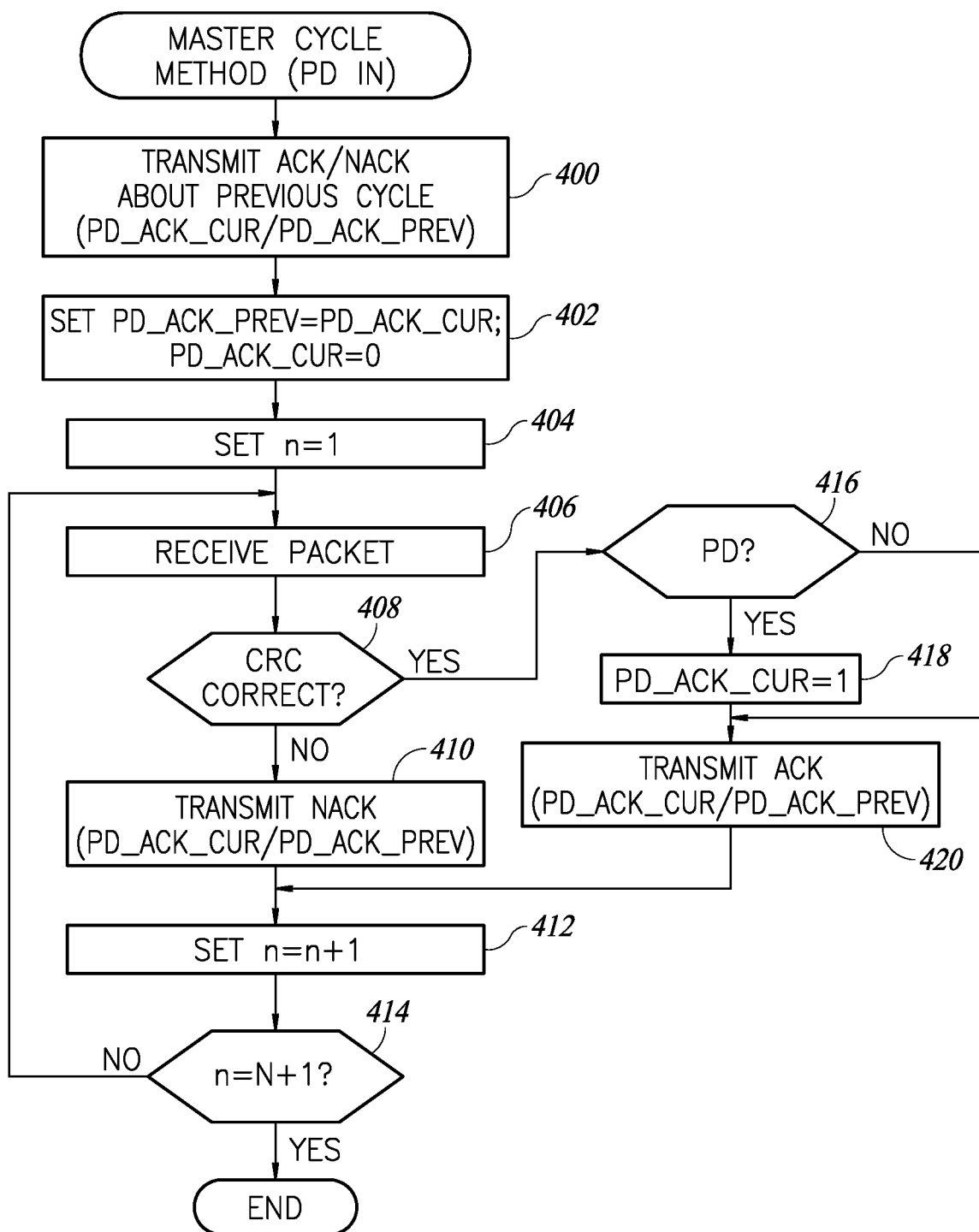
FIG. 17 is a diagram illustrating an example PD-in master cycle method.

A diagram illustrating an example PD-in master cycle method is shown in FIG. 17. The method begins by the master transmitting to the device either an ACK or a NACK message with PD_ACK_CUR and PD_ACK_PREV flags about the previous cycle (step 400). The master sets PD_ACK_PREV to be the PD_ACK_CUR status from the previous cycle and resets PD_ACK_CUR=0 for the current cycle (step 402). The master then sets a subcycle counter n=1 (step 404). A loop is entered where a packet is first received (step 406) and then the CRC is checked (step 408). If it is correct, the packet is checked whether it is a PD or an OD packet (step 416). If the packet is of PD type, PD_ACK_CUR is set (step 418). In both cases an ACK is transmitted to the device (step 420).

If the CRC is incorrect or the packet was completely out of sync (i.e. misdetected) (step 408), a NACK is transmitted (step 410). Note that both ACK and NACK responses have PD_ACK_CUR and PD_ACK_PREV flags inserted. The subcycle counter is increased by one (step 412) and it is then checked whether the number of subcycles per cycle, i.e. N, has been reached (step 414). If not, the master loops back to step 406. Otherwise, the process ends.

Figure 18A:
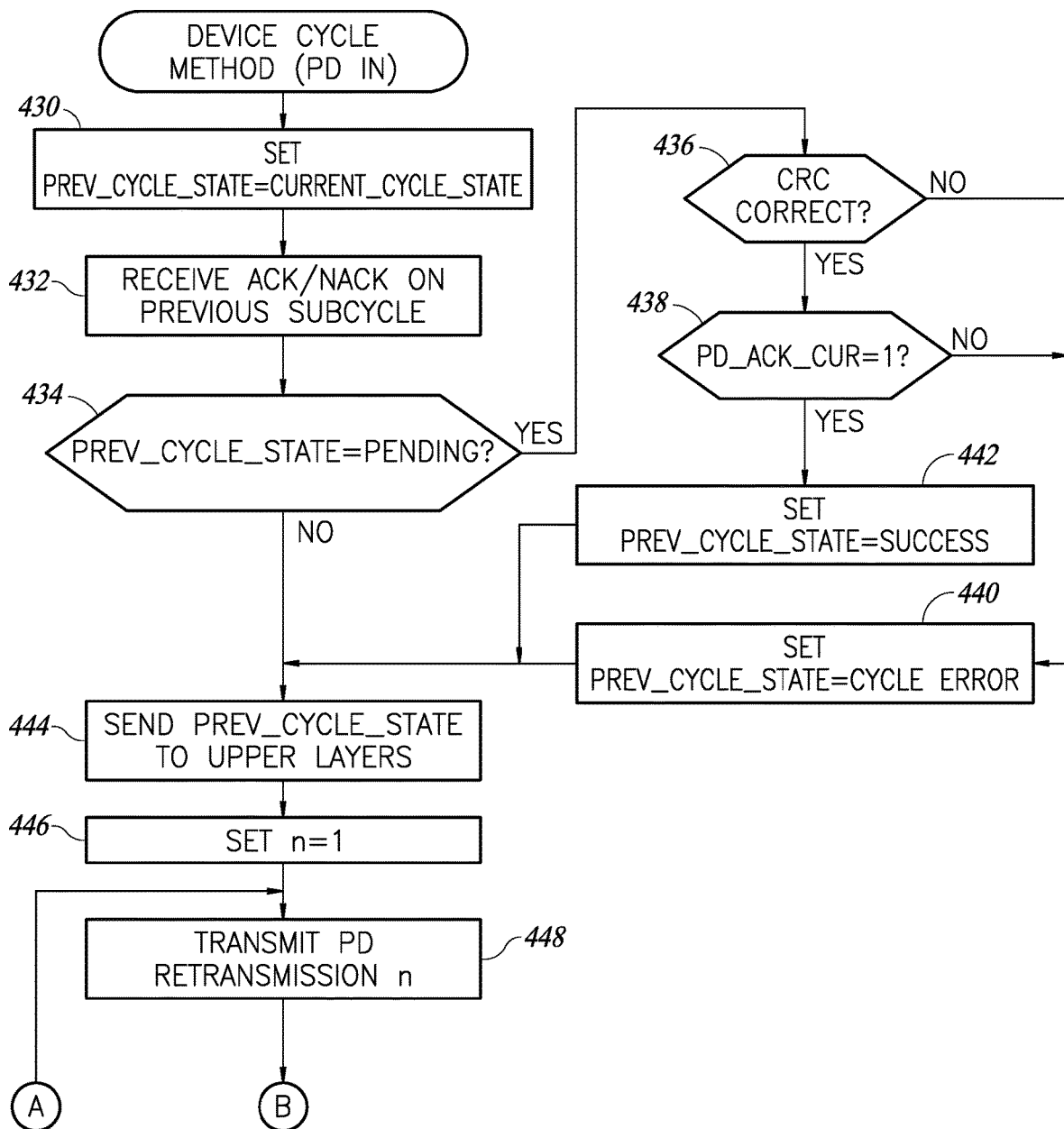
FIGS. 18A and 18B are a diagram illustrating an example PD-in device cycle method.
Figure 18B:
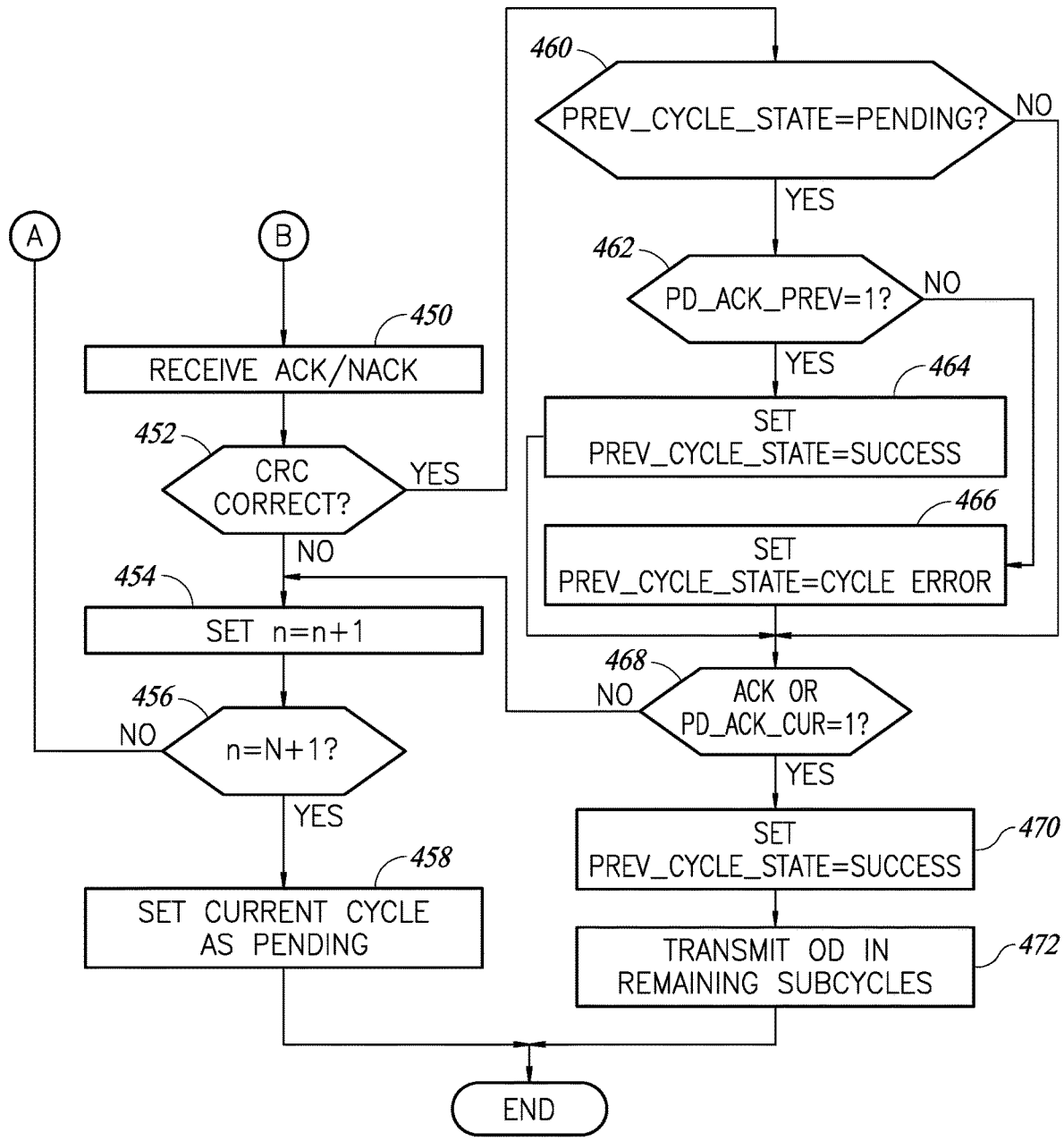

A diagram illustrating an example PD-in device cycle method is shown in FIGS. 18A and 18B. The method typically starts at the beginning of the cycle. The device sets the previous cycle state to be the current cycle state from the previous cycle (step 430). This is done because whatever information in the previous cycle state has already been used and recorded by the upper protocol levels.

The device then attempts to receive the ACK/NACK relating to the previous subcycle (step 432). It checks whether the previous cycle state is still pending (step 434). If not, the previous cycle state is transmitted to the upper protocol layers to be embedded in other messages (step 444). If the previous cycle state was 'Pending', the device checks whether the CRC of the message received was correct (step 436). If not, then no new information is available and the previous cycle state is marked as a cycle error (step 440). If the CRC was correct, however, the device then decodes this information and checks whether PD_ACK_CUR=1 in the final message within the subcycle (step 438). If it was, it sets the previous cycle state to 'success' (step 442). Otherwise, it sets the previous cycle state to cycle error (step 440).

From step 444 the device sets a counter 'n' representing the PD transmission number to n=1 (step 446). The device then attempts to transmit the $n^{th}$ retransmission of PD (step 448). The device attempts to receive the ACK/NACK packet (step 450) and checks the packets validity (step 452). If the packet is valid (i.e. CRC is identical), the device checks whether the previous cycle state is 'Pending' (step 460). If not, the status of the current cycle PD transmission is checked (step 468). If the previous cycle state is pending (step 460), the device checks the PD_ACK_PREV flag it received (step 462). If PD_ACK_PREV=1 then the previous cycle state is set to 'success' (step 464), otherwise it is set to 'cycle error' (step 466).

The device then checks whether PD_ACK_CUR=1 or an ACK has been transmitted (step 468). If so, the device is positive that the PD message transmitted in one of the transmissions of step 448 has been received successfully by its recipient (i.e. a master in this case). In response, the current cycle state is set to 'success' (step 470). OD packets are then transmitted for the remainder of the cycle (step 472).

If both conditions in step 468 are not satisfied, the device increases the transmission counter 'n' (step 454). It then checks whether the maximum number of transmissions N has been reached, where N is the number of subcycles per cycle (step 456). If not, the device attempts another retransmission in step 448. If the maximum amount of transmissions has been reached, the device sets the current cycle state as 'pending' (step 458). At this point, the device has no positive information on whether any of its PD transmissions have been successfully received by the master. Therefore, the current cycle state is marked as pending and is left for the device in the next cycle to determine.

Note that by introducing a one cycle maximal latency in determining cycle errors the mechanism allows N more attempts for the master to convey information about the success of PD transmission in the previous cycle. Since the cycle error information is transmitted back to the master through upper layers, which have an undefined latency of their own, the one cycle delay is typically immaterial to practical implementation. Therefore, this mechanism is highly advantageous and alleviates much of drawback of prior art implementations.

It is appreciated that the mechanism of the invention are not limited to a certain delay or number of bits added/affixed to the ACK/NACK messages. One skilled in the art may implement this mechanism by introducing multiple cycle delays and affixing more than two bits to the ACK/NACK or other messages.

Figure 19:
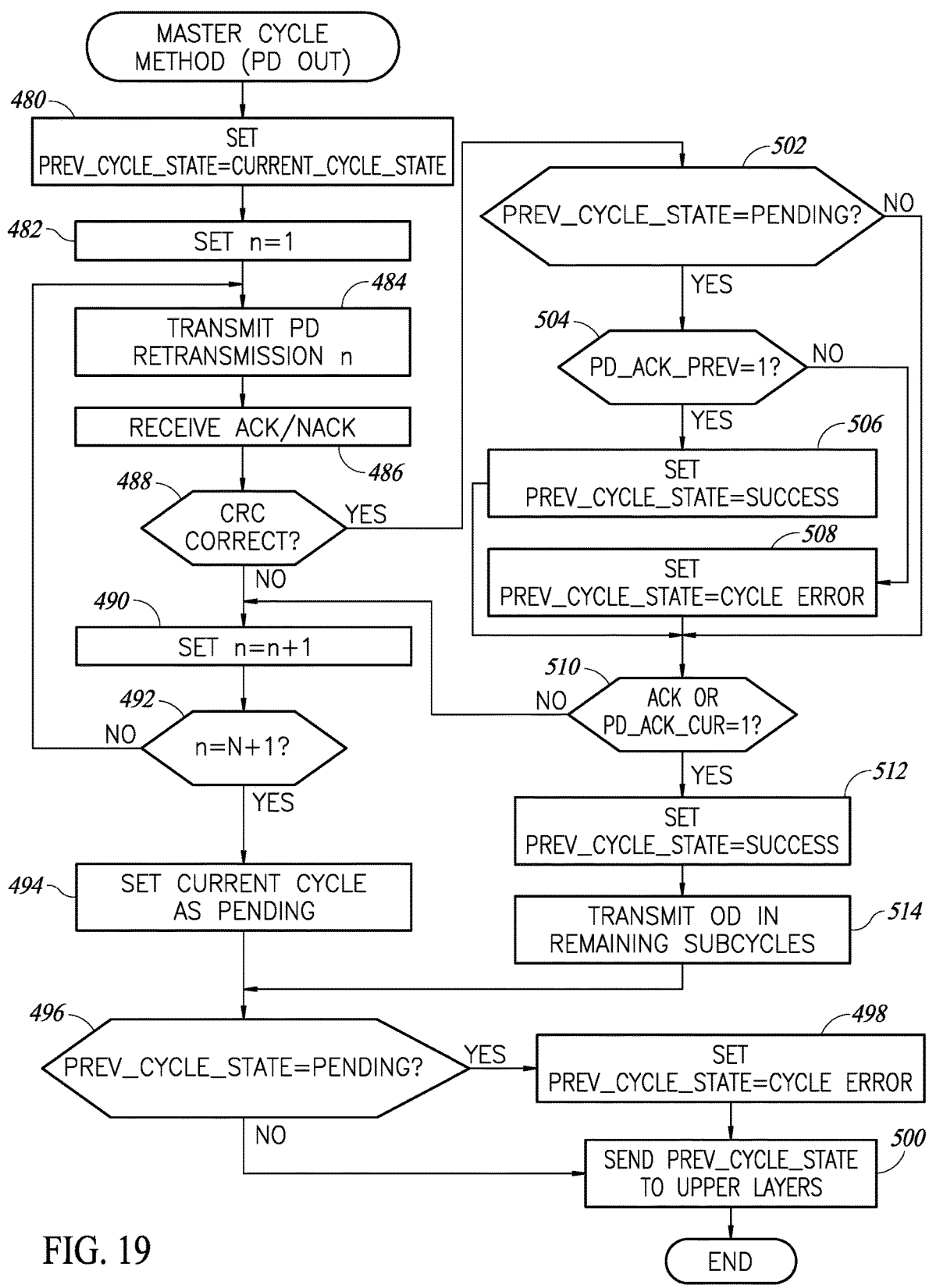
FIG. 19 is a diagram illustrating an example PD-out master cycle method.

A diagram illustrating an example PD-out master cycle method is shown in FIG. 19. The method starts at the beginning of the cycle. The master first sets the previous cycle state to be the current cycle state (from the previous cycle) (step 480). This is done because whatever information in the previous cycle state has already been used and recorded by the upper protocol levels.

A counter representing the PD transmission number 'n' is set to 1 (step 482). The device then transmits the $n^{th}$ transmission of the PD packet (step 484). The master attempts to receive the ACK/NAK packet (step 486) and checks the packet's validity (step 488). If the packet is valid (i.e. CRC is identical), the master checks whether the previous cycle state is 'pending' (step 502). If not pending (step 502), the status of the current cycle PD transmission is checked (step 510). If the previous cycle state is pending (step 502), the master checks the PD_ACK_PREV flag affixed to the message it received (step 504). If PD_ACK_PREV=1 then the previous cycle state is set to 'success' (step 506). Otherwise, the previous cycle state is set to 'cycle error (step 508).

In step 510 the master checks whether the PD_ACK_CUR=1 or an ACK has been transmitted. If true, the master is then certain that the PD message transmitted in one of the transmissions of step 484 has been received successfully by its recipient (a device in this case) and the current cycle state is set to 'success' (step 512). OD packets are then transmitted for the remainder of the cycle (step 514).

If both conditions in step 510 are not satisfied, the master increments the transmission counter 'n' (step 490). It checks whether the maximum number of transmissions N has been reached (where N is the number of subcycles per cycle) (step 492). If not, the master returns to step 484 for another PD transmission. If the maximum number of retransmissions has been reached (step 492), the master sets the current cycle state as 'pending' (step 494). If the master has reached this point, it has no positive information on whether any of its PD transmissions have been successfully decoded by the device. Therefore, the current cycle state is marked as 'pending' and is left for the master in the next cycle to determine.

The master checks whether the previous cycle state is 'pending' (step 496), meaning no information (through ACK or PD_ACK_CUR) has been received about the PD successful reception by the master. In this case, the master marks the previous cycle state as 'cycle error' (step 498). In any case, the previous cycle state is sent to the upper protocol layers (step 500) and the method ends.

Note that at the end of the method, the master will have determined the status of the previous cycle and set the current cycle state to either 'success' or 'pending.' If the latter, the state of this cycle will be determined during the subsequent cycle. By introducing a one cycle maximal latency in determining cycle errors, the mechanism allows N additional attempts for the master to convey information about the success of PD transmission in the previous cycle. Since the cycle error information is transmitted back to the master through upper layers, which have an undefined latency of their own, the one cycle added latency is immaterial to practical implementation. Therefore, this embodiment is highly advantageous and alleviates much of drawback of prior art implementations.

Note further that the mechanism of the present invention is not limited to a certain delay or number of bits added/affixed to the ACK/NACK messages. One skilled in the art may implement the mechanism by introducing multiple cycle delays and affixing more than two bits to the ACK/NACK or other messages.

Figure 20:
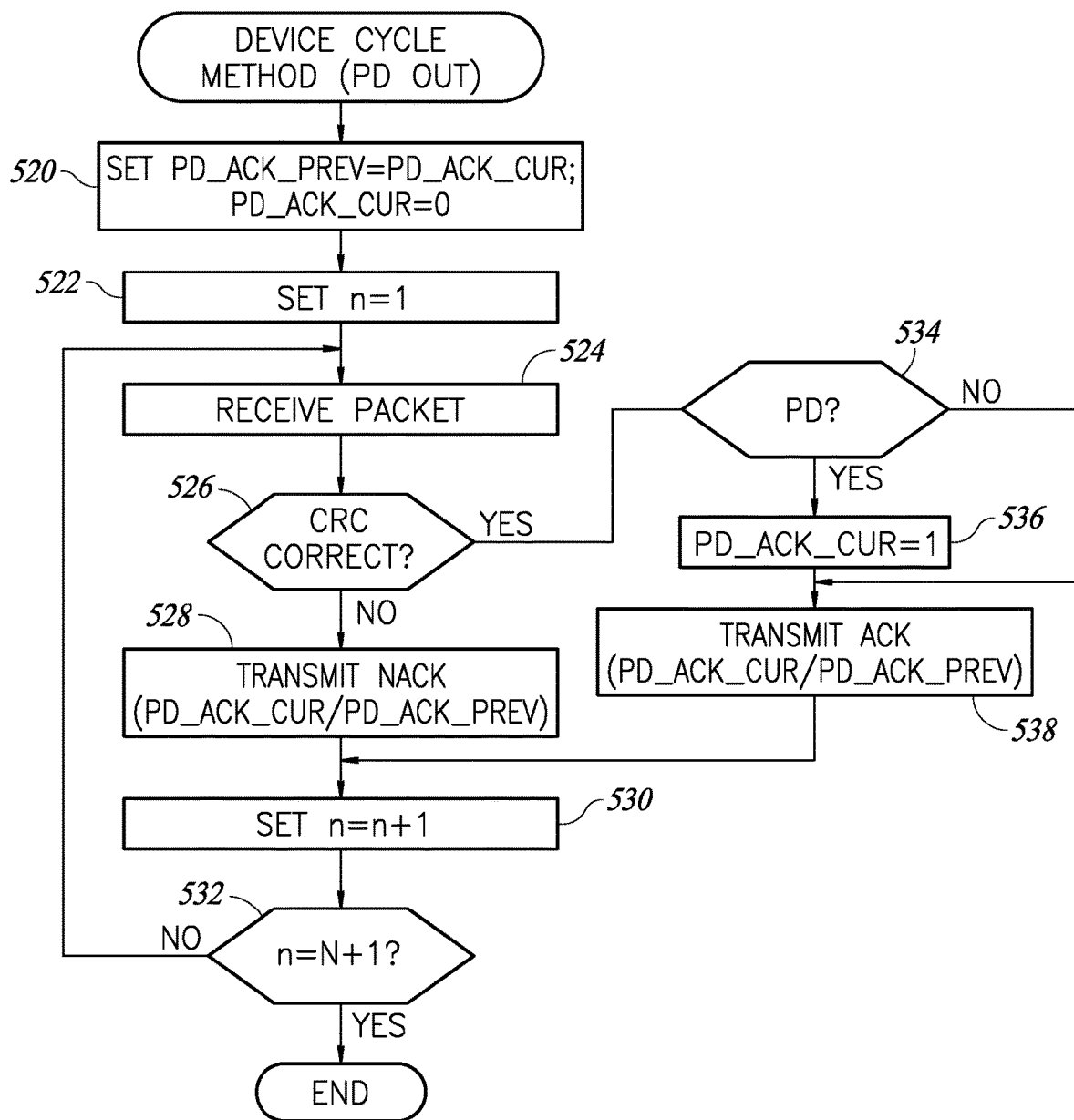
FIG. 20 is a diagram illustrating an example PD-out device cycle method.

A diagram illustrating an example PD-out device cycle method is shown in FIG. 20. The device first sets PD_ACK_PREV to be the PD_ACK_CUR status from the previous cycle and sets PD_ACK_CUR=0 for the current cycle (step 520). The device then sets a subcycle counter n=1 (step 522). It then enters a loop where a packet reception is attempted (step 524). The CRC of the packet is then checked (step 526). If correct, the packet is checked whether it is a PD or an OD type (step 534). If the packet is of PD type, set PD_ACK_CUR=1 (step 536). In both cases an ACK with PD_ACK_CUR and PD_ACK_PREV bits are transmitted (step 538).

If the CRC is incorrect or the packet was completely out of sync (i.e. misdetected) (step 526), a NACK with PD_ACK_CUR and PD_ACK_PREV bits are transmitted (step 528). Both The subcycle counter is incremented (step 530) and it is checked whether the number of subcycles per cycle (N) has been reached (step 532). If not, the device loops back to step 524 to receive another packet. Otherwise, the process ends.

Adaptive Hopping Mechanism and Frequency Table Construction

A diagram illustrating an example frequency hopping table is shown in FIG. 21. The IOLW standard hopping table, generally referenced 540, is generated by the standard HT01 frequency scrambling algorithm. The table comprises a list of frequencies 548 in MHz over the ISM band for each track 542, namely tracks 1 to 5. The tracks are synchronized in time.

The table length is 31 subcycles 544 which is a prime number. Assuming three subcycles per cycle 546, the table length of 31 accommodates 9 and ⅓ cycles. The tracks have a minimal spacing of 3 MHz between their frequencies at any given time.

For example, in track 1, the first cycle 0 comprises the frequencies 2457, 2478, and 2466 MHz. The second cycle 1 comprises 2455, 2476, and 2464 MHz. The $10^{th}$ cycle comprises the last and first two entries in the table, i.e. 2469, 2457, 2478 MHz.

Note that due to the lack of cycle initialization in the standard and the prime length of the table, the PD data may be transmitted anywhere on this frequency table on three consecutive frequency entries. It may very well be the case that the three frequencies chosen a priori such as 2457, 2478, and 2466 will be jammed or at nulls of a fading channel. In this case, the PD packet transmission will fail almost deterministically.

The HT01 method as implemented in the IOLW specification calls for dividing the frequencies statically among the various network users. Following a static definition of an initial set of blacklisted frequencies (i.e. ones where WLAN APs/STAs occasionally transmit), the remaining frequencies are divided among the subcycles, cycles and tracks to provide maximal "a priori frequency diversity." This means that under ideal static channels and interferers, and without any adaptation or dynamic changes to the frequency tables, the generated tables (known as HT01) are ideal.

In addition, the size of the hopping table is a prime number (i.e. 31). This causes the PD data to drift and cycle through the different frequencies in every PD transmission. Furthermore, the table columns are "scrambled" based on the master ID where different masters in the same cell use random tables in an unsynchronized fashion.

A disadvantage of the HT01 method is that the blacklisted frequencies reduce channel capacity and may be in use by interferes only a small portion of the time. Another disadvantage is that since the frequency tables are static, the blacklisting mechanism is used extensively, thereby blocking all possible interferer frequencies.

Yet another disadvantage is that the channels and interferers are actually dynamic (i.e. packetized data, fading channels, moving objects, fluorescent interferes, etc.). Thus, using fixed tables is highly suboptimal because during the time that interferers are silent, the channels are still blacklisted when they could have been utilized. A further disadvantage of prior art methods is that the system is high suboptimal for PD probability of error. Under static mapping, a cycle might have three interfered or faded frequencies. In this case, the PD transmission is almost sure to fail.

Yet another disadvantage is that multiple masters within the same cell use random tables in an unsynchronized fashion. In this case, the theoretical frequency collision rate reaches above 30% which is problematic.

Figure 22:
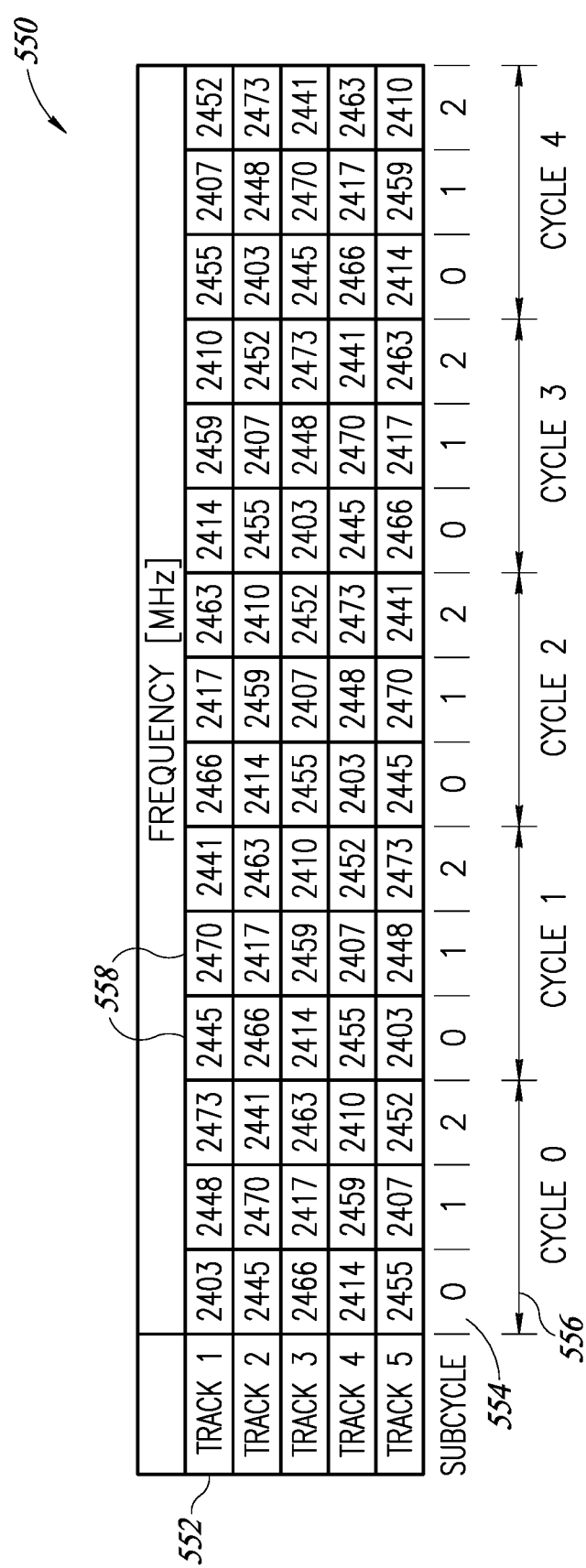
FIG. 22 is a diagram illustrating an example revised frequency hopping table optimized to improve transmission reliability.

A diagram illustrating an example revised frequency hopping table optimized to improve transmission reliability is shown in FIG. 22. For this example, it is assumed that each cycles comprises three subcycles for all tracks and devices. The frequency table, generally referenced 550, comprises 15 columns of frequencies 558 rather than 31. In this example embodiment, the number of columns is an integer multiple of the number of subcycles 554 per cycle 556. The advantage of constructing the table this way is that it allows for designated frequency channels for transmission of PD packets. The mechanism opts to construct the table such that the best channels (according to some metric) are allocated in the first subcycle for the PD packets, the second best in the second subcycle, and so on. Thus, the subcycles are prioritized with the first having the highest priority and the last having the lowest priority. An example mechanism of constructing the table is described in more detail infra.

The frequency table 550 covers five complete cycles and has an airtime length of (5*5 ms=25 ms). The synchronization mechanism ensures that if PD data is available it will always be transmitted in subcycle 0. If a retransmission is required, it will occur in subcycle 1 and if another retransmission is required it will occur in subcycle 2.

Figures 23, 24A, 24B, 24C:
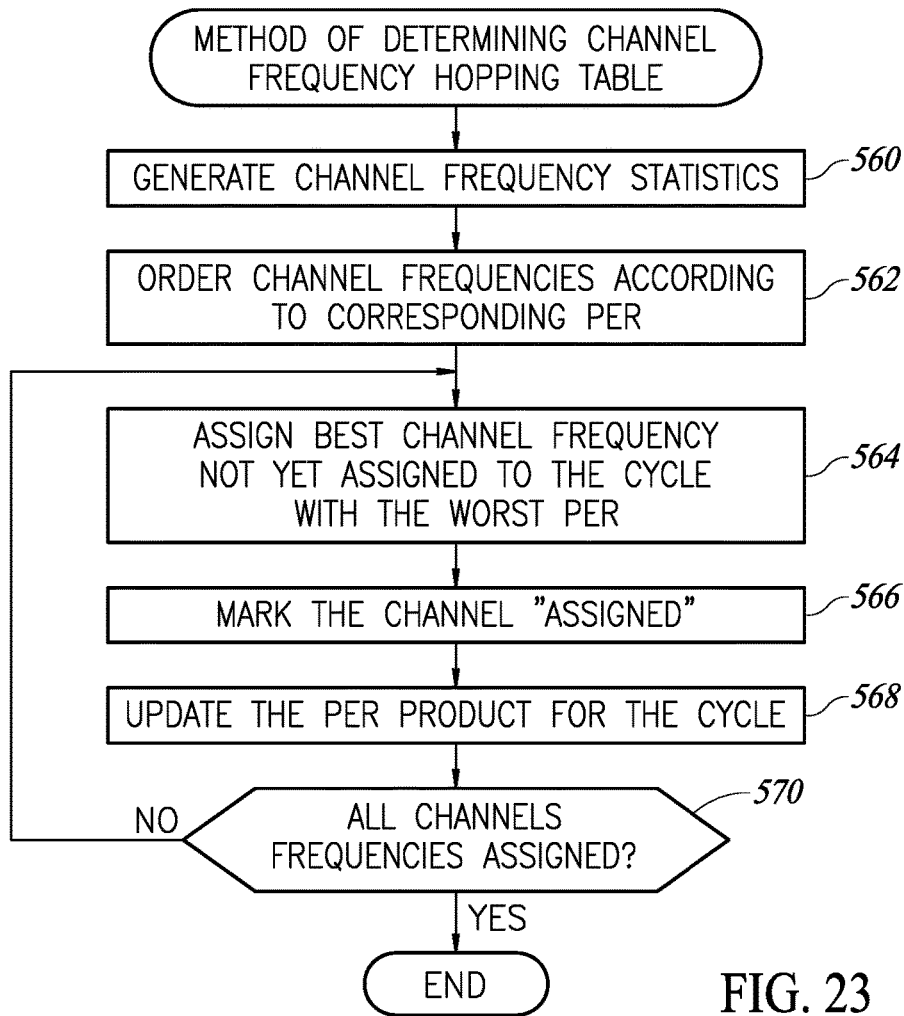
FIG. 23 is a diagram illustrating an example method of determining the channel frequency hopping table.
FIG. 24A is a diagram illustrating an example channel frequency PER table in a first stage in the process of generating the channel frequency hopping table.
FIG. 24B is a diagram illustrating an example channel frequencies table in a first stage in the process of generating the channel frequency hopping table.
FIG. 24C is a diagram illustrating an example cycle PER table in a first stage in the process of generating the channel frequency hopping table.

A diagram illustrating an example adaptive hopping mechanism and method of constructing the channel frequency table is shown in FIG. 23. Statistics are generated for each channel frequency in the table (step 560). Note that in one embodiment, both short term and long term packet error rate (PER) statistics are maintained. Periodically the short and long term statistics are compared to determine whether the recent short term statistics is statistically plausible the current long term statistics.

The channel frequencies are then ordered according to corresponding PER (step 562). The best performing channel frequency not yet assigned is allocated to the cycle with the worst performing PER (step 564). This is in essence an implementation of the well-known greedy algorithm which is commonly used in optimization problems. The algorithm makes the optimal choice at each step as it attempts to find the overall optimal way to solve the problem. It is noted that in one example embodiment, the first group of N channels are assigned arbitrarily to the first N cycles rather than one by one.

Once a channel frequency is allocated, it is marked as 'assigned' (step 566). The PER product is updated for that cycle (step 568). If all channel frequencies have not yet been assigned (step 570), the method continues to allocate channels in step 564 until all channels are allocated.

An application of the greedy algorithm to an example frequency table of nine channel frequencies will now be described. Note that it can be applied to frequency tables having any number of frequencies. The algorithm is used to populate the frequency table in case of a one track master. A diagram illustrating an example channel frequency PER table in a first stage in the process of generating the channel frequency hopping table is shown in FIG. 24A. A diagram illustrating an example channel frequencies table in a first stage in the process of generating the channel frequency hopping table is shown in FIG. 24B. A diagram illustrating an example cycle PER table in a first stage in the process of generating the channel frequency hopping table is shown in FIG. 24C.

Table 580 comprises two rows, including a frequency channel lower row and a corresponding PER estimation upper row. The channels in the table are sorted according to the PER estimations from low (0) to high ($10^{-1}$). The PERs shown reflect the statistics collected previously on each channel using methods such as averaging, windowed average, exponential windowed average, etc. The actual collection and estimation methods used are not critical to the invention.

Table 582 is the frequency table to be populated divided by subcycles 0, 1, 2 versus cycles along the x-axis which shows cycles 0, 1, 2. In this example, the number of subcycles per cycle is three and the table comprises nine entries (i.e. three cycles).

Table 584 shows the corresponding population PERs of the populated channels for subcycles 0, 1, 2. The x-axis corresponds to cycles and comprises three cycles 0, 1, 2. The table also contains a PER product bottom row, which holds the product of the PERs for each cycle already populated. This represents an estimate probability of the PD transmission to fail in all subcycles already populated. The PER for the bottom row is calculated by simply multiplying the probability of the individual populated subcycle error probabilities as shown below.

$$PER = \Pi_{i=0}^{N-1} P_i \quad (1)$$

where PER is the estimated probability of all N transmissions failing, $P_i$ is the probability of error for subcycle PD data transmission; and N is the number of subcycles within a cycle.

The initial step of the greedy algorithm is to populate the first subcycle of each cycle with the N best frequencies in descending PER order. Since channel 5 has the best PER (0 in this example) it populates table 582 for the first subcycle 0 of cycle 0. In this manner, channel 9 and 13 are populated in subcycle 0 for cycles 1 and 2, respectively.

Note that an exception may be made for a PER of zero, meaning that the statistics collection prior to this step has not detected even a single error. In this case, the algorithm may replace the zero PER with a plug number, which may be calculated as 1/M, where M is the number of packets counted in order to avoid biased planning.

A diagram illustrating an example channel frequency PER table in a second stage in the process of generating the channel frequency hopping table is shown in FIG. 25A. A diagram illustrating an example channel frequencies table in a second stage in the process of generating the channel frequency hopping table is shown in FIG. 25B. A diagram illustrating an example cycle PER table in a second stage in the process of generating the channel frequency hopping table is shown in FIG. 25C.

These figures show the subsequent two steps of the greedy algorithm for construction of the frequency table. Table 590 shows the channels and corresponding PERs. Note that channels 5, 9, 13 are 'X'ed to indicate they have already been allocated. Table 592 shows the frequency table to be populated divided by subcycles 0, 1, 2 versus cycles 0, 1, 2 on the x-axis.

Table 594 shows the corresponding population PERs of the populated channels with subcycles 0, 1, 2 versus cycles 0, 1, 2. The table also contains a PER product bottom row, which holds the product of the PERs for each cycle already populated. This is an estimated probability of the PD transmission to fail in all subcycles already populated.

The algorithm continues to allocate each remaining channel whereby each channel is allocated to the worst cycle as defined as the cycle having the highest PER product from previous steps.

Since cycle 2 has the highest PER product from previous steps ($10^{-3}$), the algorithm allocates the remaining best frequency channel 17 to subcycle 1 of cycle 2 as shown. After allocating frequency channel 17 having an estimated PER of $10^{-2}$, the PER product for cycle 2 is $10^{-3}*10^{-2} = 10^{-5}$, which is still the highest PER product in the table. Therefore, the next best frequency channel (i.e. frequency channel 65) is allocated to subcycle 2 in cycle 2.

After the allocation of channel 65, the PER product for this cycle is $10^{-3}*10^{-2}*10^{-2} = 10^{-7}$. As can be seen in every step, the algorithm aims to allocate the next best frequency channel to the currently worst cycle, according to the previous allocations, hopefully in an attempt to improve its PER product. In this example, the algorithm improved the PER product for cycle 2 from $10^{-3}$ to $10^{-5}$ to $10^{-7}$ thereby overshooting the other cycles, whose PER products are $10^{-6}$ each.

A diagram illustrating an example channel frequency PER table in a third stage in the process of generating the channel frequency hopping table is shown in FIG. 26A. A diagram illustrating an example channel frequencies table in a third stage in the process of generating the channel frequency hopping table is shown in FIG. 26B. A diagram illustrating an example cycle PER table in a third stage in the process of generating the channel frequency hopping table is shown in FIG. 26C.

These figures show the final four steps in the greedy algorithm according to the example presented. Table 600 shows the channels and their corresponding PERs. Note that channels 17 and 65 are 'X'ed indicated they have been allowed.

The next best available frequency channel 25 is allocated to subcycle 1 of cycle 0 due to the fact that its PER product is $10^{-6}$. Note that the PER product of cycle 1 is also $10^{-6}$. To break a tie, the algorithm may allocate the channel based on any desired criteria, such as first ordinal number in the table, furthest from previous channels already allocated to this cycle, etc. This brings the PER product for cycle 0 to $10^{-6}*10^{-2} = 10^{-8}$.

The algorithm then allocates the next worst channel frequency 32. Since the PER products for cycles 0, 1, 2 are $10^{-8}$, $10^{-6}$ and $10^{-7}$, respectively, the algorithm allocates frequency channel 32 to cycle 1, changing its PER product to $10^{-6}*10^{-1} = 10^{-7}$. The PER product for cycles 0, 1, 2, now stand at $10^{-8}$, $10^{-7}$, and $10^{-7}$, respectively. The algorithm therefore allocates frequency channel 47 to cycle 1 and the remaining frequency channel 37 to cycle 0. The PER products after completing the frequency allocation for cycles 0, 1, 2 are $10^{-9}$, $10^{-8}$, and $10^{-7}$, respectively.

Thus, the greedy algorithm is operative to substantially equalize the PER products of the cycles in the table, while putting the best channels in the first subcycles. This is advantageous over prior art implementations because (1) the PD probability of success is roughly the same between the various cycles, (2) the transmission is synchronous (so that the PD is always first transmitted in the first subcycle), and (3) the best channels are allocated to the first subcycles.

It is noted that using the PER as the only criterion for assigning the frequency is just one possible implementation. Alternatively, other criteria separately or in conjunction with the PER may be used, such as distance from previously allocated subcycle frequencies within a cycle, frequencies allocated for different tracks, etc.

The adaptive hopping mechanism and associated frequency table construction method of the present invention has several advantages with respect to the prior art implementations. First, the PD transmission is optimized because the best performing channels are allocated to the first subcycles within a cycle. In addition, PD data is transmitted in the first subcycle before attempting a retransmission in the second subcycle and so on in contrast to prior art implementations where PD is transmitted randomly on available subcycles and drifts across the frequency table.

Second, the operator can now use black listing sparingly due to the fact that channel statistics and metrics is used to sort the channels. Interferer duty cycle might reduce a channel's quality but does not necessarily black list it altogether.

Third, the algorithm used to construct the frequency table tries to equalize the cycle quality and will not allow outlier cycles with no chance of PD transmission.

In order to constantly improve and track changes in the channel and interferer conditions, the master constantly tracks and updates the PER estimation per frequency (worst case of all devices within a track). Long term and short term statistics are constantly updated per track per frequency.

In order to detect deterioration (or improvement) of a specific frequency, the short term statistics are tested versus the long term statistics while applying a probability criteria that, in one embodiment, is based on the binomial approximation. Note that other testing mechanisms are possible as well as is known in the art and is not critical to the invention.

For example, if long term statistics (e.g., the last five minutes, or 5000 subcycles) indicate a subcycle PER of $10^{-3}$ but during the last four seconds (i.e. 200 subcycles) five error events occurred, the algorithm will detect an unlikely event. In one embodiment, this can be done using a binomial distribution estimation. The probability of having k errors from N tests, where the test error probability is p and all events have independent and identical distributions (IID) is given by:

$$Pr(k, N \mid p) = \binom{N}{k} p^k (1-p)^{N-k} \quad (2)$$

$$\text{where } \binom{N}{k} = \frac{N!}{k!(N-k)!}$$

is the binomial coefficient, p is the long term probability of error (i.e. the number of errors collected divided by number of subcycles), k is the number of errors collected in the short term statistics, and N is the number of subcycles counted in the short term statistics.

In this case, the probability of such an event is computed to be $Pr \sim 2 \cdot 10^{-6}$. Such a rare event will trigger two mechanisms: (1) an increase of the equivalent long term PER to reflect this event (e.g., by isolating p from Equation 2, the algorithm may update the PER (i.e. p) to be $7 \cdot 10^{-3}$ in which five errors out of 200 trials have a probability of $10^{-2}$); and (2) the potential replacement of this degraded frequency channel and reordering (rebuilding) of the frequency table.

In this example embodiment, the short term statistics and long term statistics are compared, and if one greatly exceeds the other, steps are taken to reconstruct the frequency table. This can be done using the following equation, which computes the probability of having the short term statistics, given the long term probability of error:

$$Pr < \text{Threshold} \quad (3)$$

When this equation is satisfied, the algorithm updates both long term statistics PER table and recalculates the table. Furthermore, every time a complete frequency table has been utilized (i.e. periodically exhausted) the entire set of frequencies are sorted and placed within a table similar to the one in FIG. 22 according to their relative performance.

The new frequency table is transmitted in OD data (ISDU service) usually within a cycle or two and the network will transition to the new frequency table in a synchronized and deterministic manner. The entire new table transmission and the synchronized transition typically take about 10 subcycles.

Figure 27:
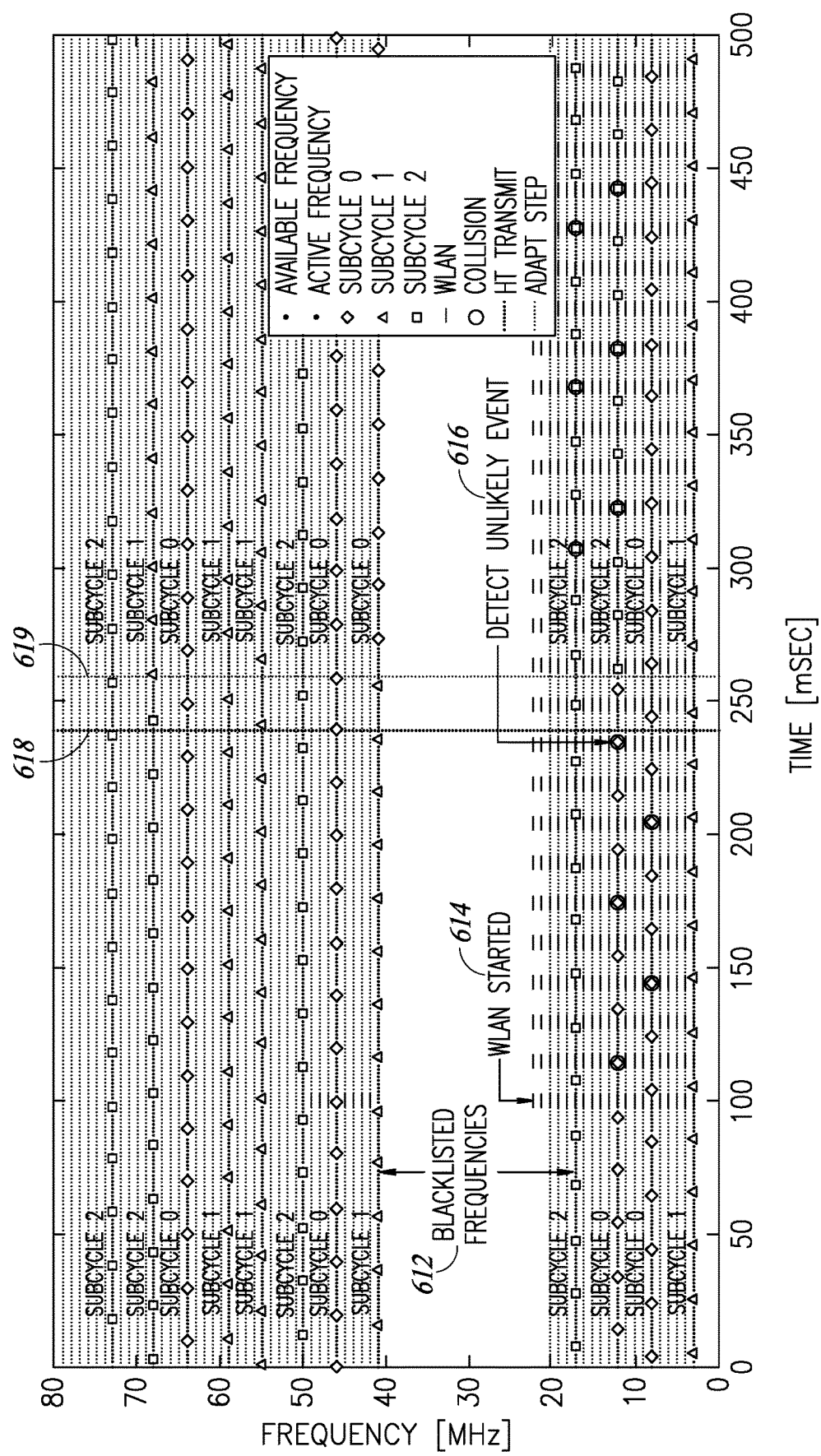
FIG. 27 is a diagram illustrating an example plot of frequency versus time using the adaptive frequency hopping mechanism of the present invention.

A diagram illustrating an example spectrogram plot of frequency versus time using the adaptive frequency hopping mechanism of the present invention is shown in FIG. 27. The spectrogram, generally referenced 610, demonstrates the tracking and dynamic frequency allocation of the present invention in the event of interferers. The y-axis represents the frequency index with index 0 signifying a frequency of 2400 MHz and index 80 signifying a frequency of 2480 MHz. The x-axis denotes the time in msec.

At the initial state (i.e. time 0), the system has 20 frequencies blacklisted 612 between frequency indices 21 and 40. Out of the available remaining frequencies, 12 frequencies have been selected and spread evenly. The frequencies are divided among the cycles and subcycles.

The subcycle 0 frequencies (indicated as diamonds) are the ones deemed by the master as having superior performance, with subcycle 1 (indicated by triangles) are deemed as having second best performance, and the remaining subcycle 2 (indicated by squares) have the worst performance.

As described supra, PD transmission in this mechanism is synchronized among all devices and always starts at subcycle 0. Thus, if the frequency quality estimation is correct, PD transmission will have optimal probability of being successful.

The spectrogram also shows periodic WLAN interferer transmissions (indicated by dashes) on frequency indices 1 through 20 (i.e. 802.11g channel 1) with a duty cycle of 1.3 msec ON and 15 msec OFF. Note that at time 0, frequency indices (i.e. channel) 8 and 12 were assigned to subcycle 0 and were assumed as having best performance.

At time 115 msec, however, an interference collision at frequency index 12 occurs and at time 145 msec with channel 8 as indicated by the circled diamonds. During these collisions, the master is unable to receive the PD data on subcycle 0. This effect repeats itself multiple times until at time point 230 msec (vertical dotted line 618), the master determines that there are too many errors and the short term statistics is incongruent with the long term statistics. On the other hand, the two collisions preceding this point on channel frequency 8 were still below the threshold of an improbably long term statistics event.

At this point, the master decides to rebuild the frequency table, and new a table consisting of a different frequency channel allocation are transmitted to the entire network. At time 260 msec (vertical dotted line 619), this transition has been completed and the network begins using the new tables. The effect of this change is that frequency channel 12 has been downgraded to subcycle 2 and frequency channel 41 has been upgraded from subcycle 1 to subcycle 0 to replace it. Subcycle 68 has been upgraded from subcycle 2 to subcycle 1 to replace frequency channel 41.

Looking into the post table change collisions, it is evident that most collisions occur on subcycle 2 frequency channels. This is significantly better than the previous situation before the table change since these subcycles are likely to carry OD information at this point rather than PD data. The PD information is transmitted in Subcycles 0 and 1 (in case of retransmission). Only if both subcycle 0 and 1 transmissions fail to be decoded, will the master transmit PD on subcycle 2. Due to the good performance of the first two subcycles, however, this event is now rare.

Figure 28:
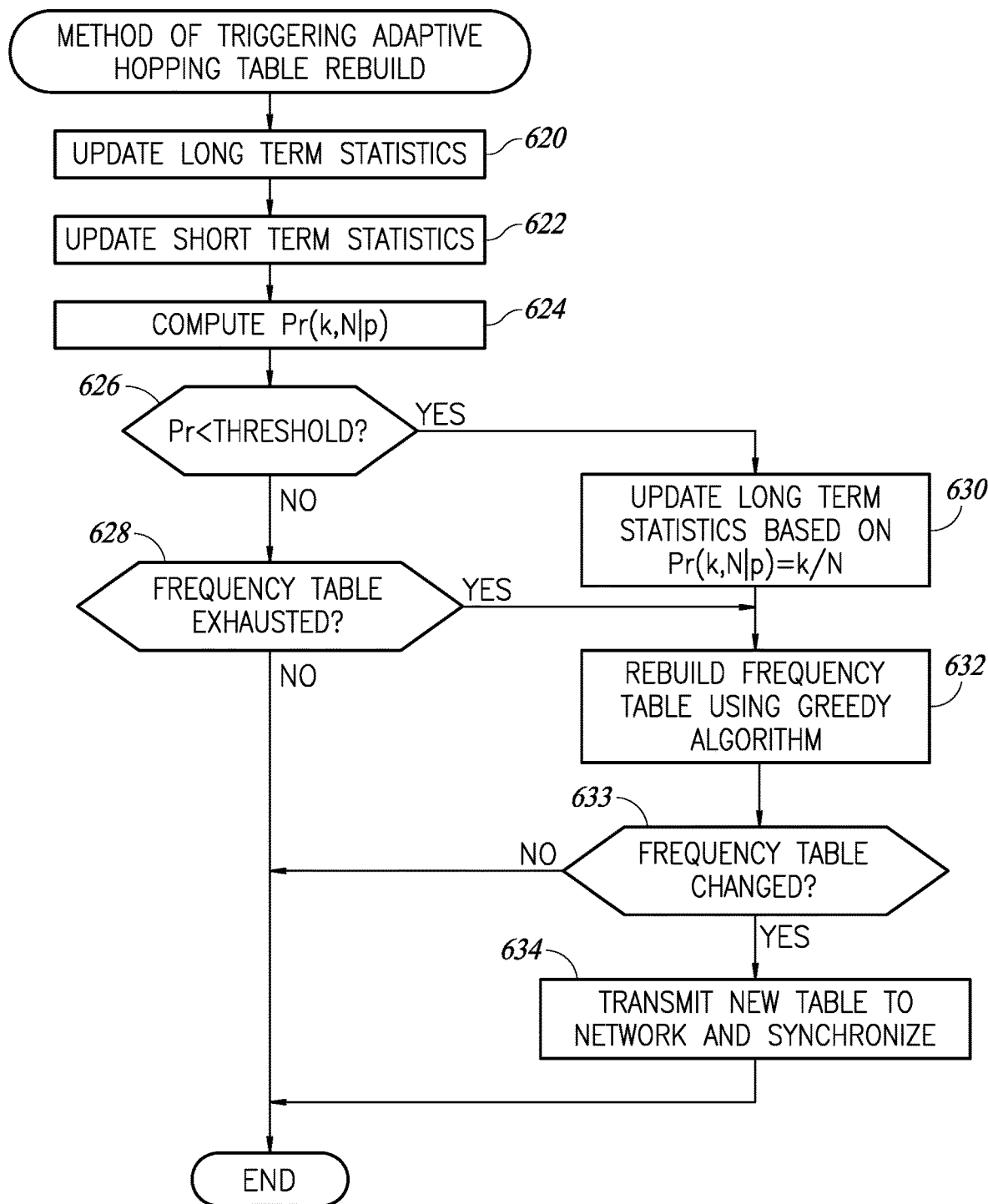
FIG. 28 is a diagram illustrating an example method of triggering an adaptive hopping table rebuild.

A diagram illustrating an example method of triggering an adaptive hopping table rebuild is shown in FIG. 28. As described supra, the mechanism maintains and periodically updates long term statistics (step 620) and short term statistics (step 622). The probability of error Pr(k, N|p) of the long term statistics given the short term statistics is calculated as given by Equation 2 supra (step 624). If the probability calculated is less than a threshold (i.e. it is a very unlikely event (step 626), then a frequency table rebuild is triggered. First, the long term statistics based on Pr(k, N|p)=k/N is updated (step 630). The frequency table is then rebuilt using the techniques described supra (step 632). If the frequency table is modified from the previous version of the table (step 633), then it is transmitted by the master to the network and synchronized with the devices (step 634). Otherwise, no action is taken, as the table has not changed from the previous version.

If the probability calculated is greater than the threshold (step 626), then the table rebuild is not triggered but it is checked whether the table frequencies have been exhausted, i.e. all frequencies have been transmitted (step 628). If so, a table rebuild is triggered and the method continues with step 632. Otherwise, the method ends and no action is taken.

Last Resort Frequency Mechanism

The last resort (or vault) mechanism is operative to optimize as much as possible the PER of a PD transmission during the last subcycle of a cycle. The mechanism optimizes the PD PER, while sacrificing OD throughput and performance on some devices in the track. When all previous subcycle transmissions are unsuccessful, the last resort mechanism can be used to salvage a successful PD transmission for a cycle.

The algorithm operates by predetermining conditions under which both master and device, each autonomously, will hop to a channel frequency having a high probability of success and without informing the rest of the network. Thus, when the last resort mechanism is activated, transmissions from other devices in the track are sacrificed since the master will have switched channel frequencies to the last resort frequency and thus cannot receive data from the other devices.

Table 1 below outlines the conditions and results of the algorithm. For the PD receiver, meaning either the master receiving data (PD-in) or the device receiving data (PD-out), a failed set of attempts (excluding the last subcycle) at receiving the PD packet result in the activation of the last resort frequency mechanism during the last subcycle. If all previous attempts have failed, it is preferable that the system make every effort to make the last subcycle transmission successful to avoid a cycle error. As described supra, the last subcycle, however, holds the worst performing frequency channel within the cycle. Therefore, switching to a different frequency channel, even at the cost of other devices losing OD data is highly effective.

TABLE 1

Decision criteria for last subcycle 'last resort' frequency

| | PD Receiver:<br>Master (PD-in)/<br>Device (PD-out) | PD Transmitter:<br>Device(PD-in)/<br>Master(PD-out) |
|---|---|---|
| Condition | Failed to receive PD1 attempts 1 ... N − 1 | Transmitted PD1 attempts 1 ... N − 1 and no ACK (PD_ACK_CUR = 0) |
| Last subcycle frequency | | Subcycle 0 frequency of the preceding cycle |

For the PD transmitter, meaning either the device transmitting (PD-in) or the master transmitting (PD-out), the last resort frequency is used in the last subcycle when all previous attempts (1 ... N-1) have been unsuccessful, i.e. no PD_ACK_CUR=1 received.

In the PD-in case, if N-1 retransmissions have been transmitted, the device only has N-2 PD_ACK_CUR reception opportunities to determine successful reception of the PD by the master. On the other hand, in the PD-out case, if N-1 retransmissions have been transmitted, the master has N-1 PD_ACK_CUR reception opportunities to determine successful reception of the PD by the device.

Note that the last resort mechanism is activated autonomously on the master and all devices where conditions have been detected/satisfied so as not to have to rely on unreliable communications within the network.

In all other cases, i.e. when the conditions have not been satisfied, the last subcycle will proceed as normal with OD and reception on the original frequency hopping scheme. If the last resort frequency has been activated on other devices, the OD packet will be transmitted on a channel not used by some of the system and is sure to fail. The ACK/NACK packets for OD packets in this scenario are also doomed to fail. This is intentional and part of the mechanism.

In one embodiment, the last resort frequency selected is the frequency used for subcycle 0 of the preceding cycle. This choice was been made due to the fact that subcycle 0 channel frequencies are the best performing and the system has already experienced packet loss under the current cycle subcycle 0 frequency channel. Note that the last resort mechanism is a further challenge on the adaptive hopping algorithm and especially on the frequency allocation mechanism described supra. The latter needs to ascertain that when master and some of the devices use the last resort frequency on the last subcycle within a cycle, a collision does not occur with the other tracks not using the last resort frequency.

Figure 29:
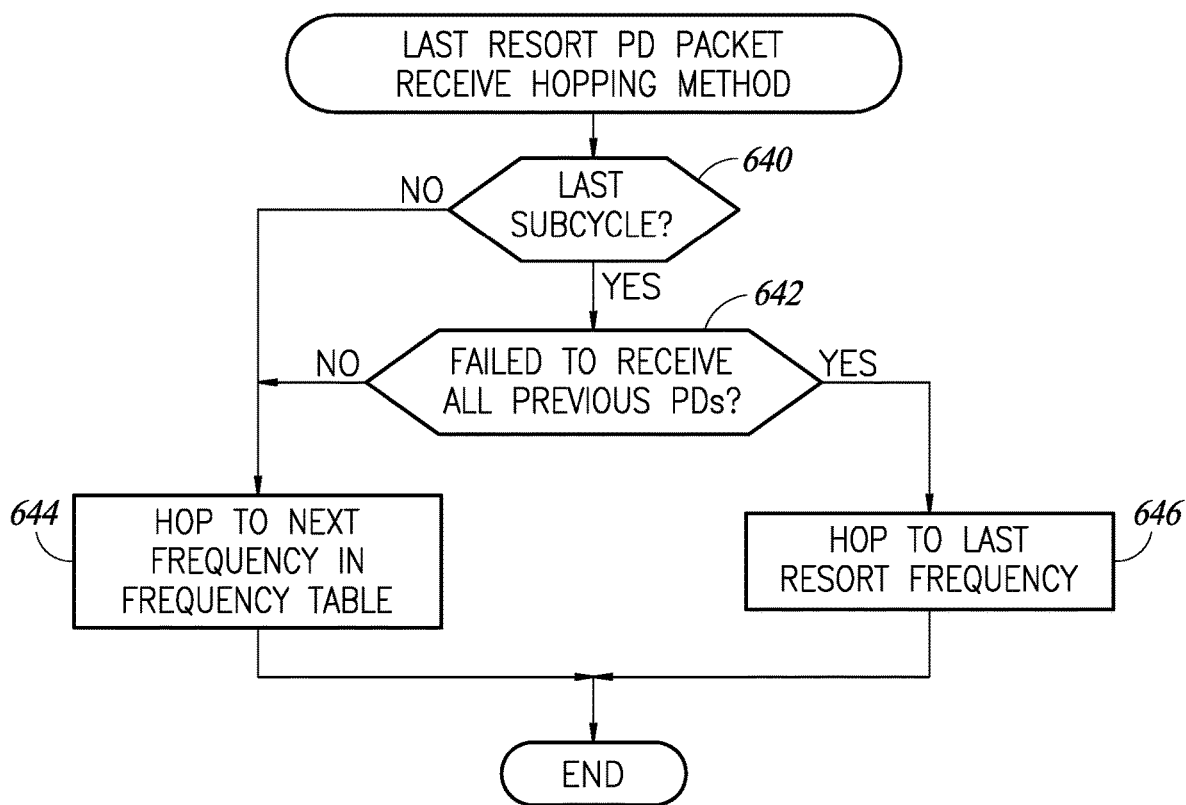
FIG. 29 is a diagram illustrating an example last resort mechanism for PD packet reception.

A diagram illustrating an example last resort mechanism for PD packet reception is shown in FIG. 29. As described supra, the last resort mechanism is triggered only in the last subcycle (step 640). If all previous PD transmissions were not received successfully (step 642), then the last resort mechanism is triggered and the master and device hop to the last resort frequency (step 646). In one embodiment, the last resort frequency is the channel frequency used for subcycle 0 of the preceding cycle. If at least one PD transmission was received successfully (step 642), the PD receiver (i.e. master for PD-in and device for PD-out) hops to the next frequency in the frequency table (step 644).

Figure 30:
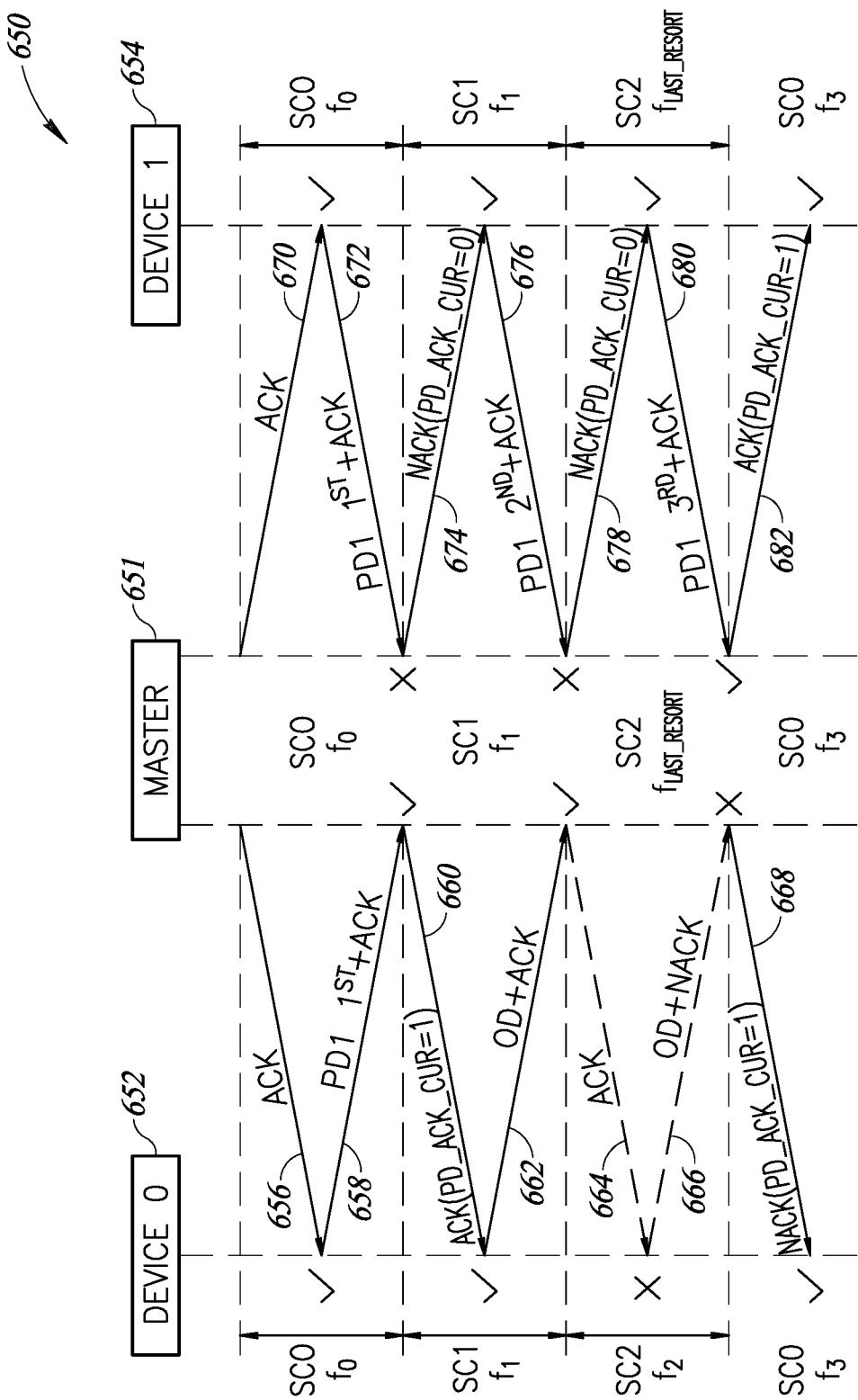
FIG. 30 is a diagram illustrating an example application of the last resort mechanism for PD packet reception.

A diagram illustrating an example application of the last resort mechanism for the PD-in case is shown in FIG. 30. The activation scenario, generally referenced 650, of the last resort algorithm with a cycle of 5 msec (three subcycles/cycle) in the PD-in case. A master 651 and two devices 652, 654 are shown (devices 0 and 1, respectively). The master in this case fails to receive two PD transmission attempts 672, 676 from device 1 and decides to switch to the last resort frequency for transmission 680. Device 1 transmits two PD attempts (i.e. it either received a NACK or incorrectly decoded an ACK 674, 678) and never received a packet with PD_ACK_CUR=1 (same condition in PD-in case) and therefore switches to the last resort frequency. Thus, the master and device 1 switch to a likely better performing channel frequency with improved chances of successful reception in the last subcycle.

Device 0, however, has successfully transmitted PD1 658 and received an ACK 660. Therefore, it sends OD data (if available) 662 in subcycle 1 and in the last subcycle 666 but does not switch to the last resort frequency. Therefore, the OD data sent in message 666 is sacrificed and cannot be received by the master.

It is noted that in terms of probabilities, the conditions under which the master switches to the last resort frequency in PD-in case are significantly more stringent than the devices' because the master has certain information about PD reception and does not rely on acknowledgement packets to verify, as do the devices. For example, if the PER for the first two subcycles is $10^{-3}$, the probability of a master on a track going to the last resort frequency is $10^{-6}*8$ devices=$8*10^{-6}$, while the probability for any single device is $\sim 10^{-3}$. This means the last resort mechanism is an opportunistic algorithm, which sacrifices OD information even without absolute certainty that such steps are required for proper PD transmission and reception. The dashed line transmissions 664, 666 indicate that these transmissions are doomed to fail by design.

Figure 31:
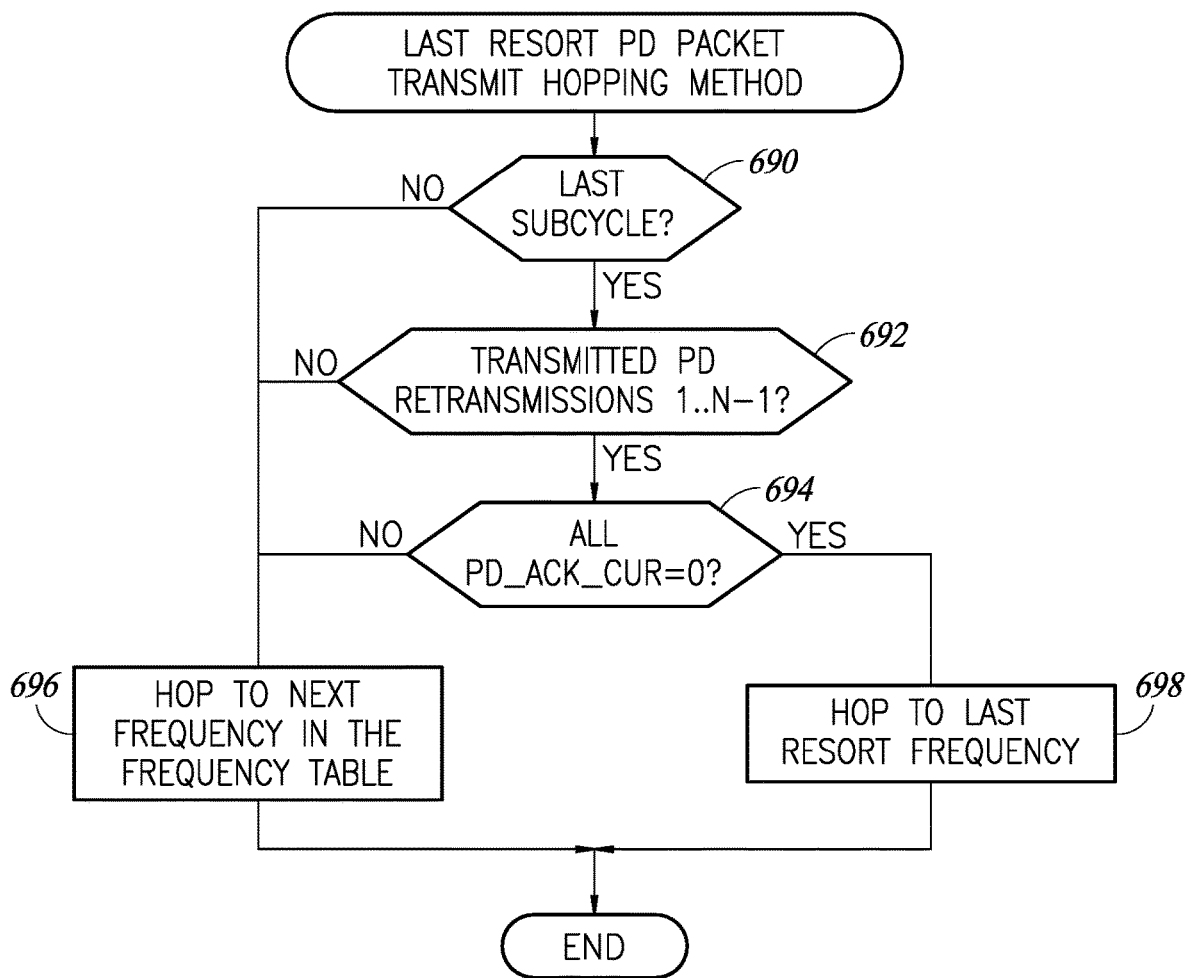
FIG. 31 is a diagram illustrating an example last resort mechanism for PD packet transmission.

A diagram illustrating an example last resort mechanism for PD packet transmission is shown in FIG. 31. If the last subcycle in the cycle has not been reached (step 690), the master or device hop to the next channel frequency in the frequency table as normal (step 696). Once the last subcycle is reached, it is checked if the PD has been transmitted N−1 times (step 692) and no successful acknowledgements were received, i.e. all PD_ACK_CUR=0 (step 694). If so, the PD transmitter (i.e. device for PD-in and master for PD-out) hops to the last resort frequency (step 698).

Figure 32:
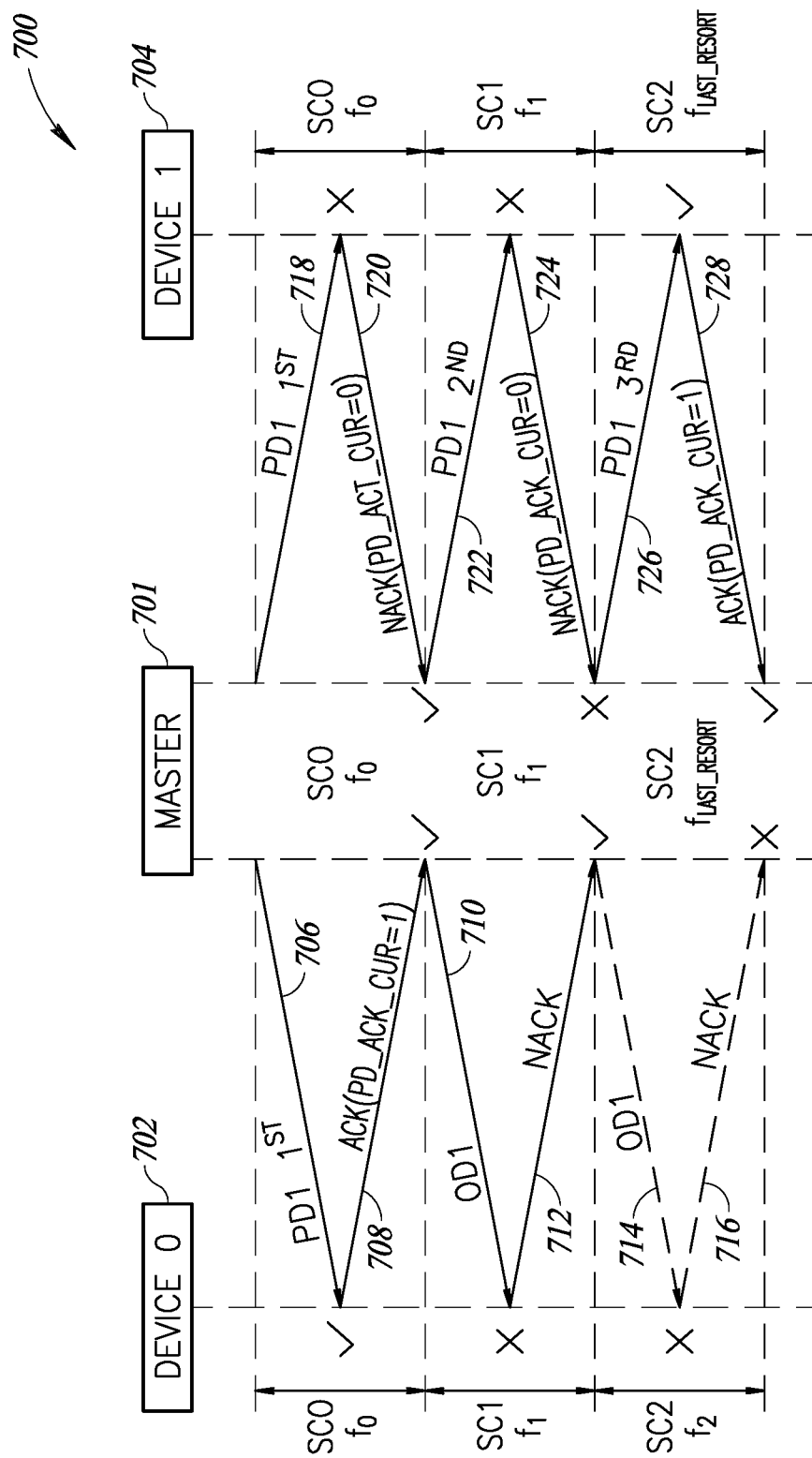
FIG. 32 is a diagram illustrating an example application of the last resort mechanism for PD packet transmission.

A diagram illustrating an example application of the last resort mechanism for the PD-out case packet transmission is shown in FIG. 32. The activation scenario, generally referenced 700, of the last resort mechanism with a cycle of 5 msec (3 subcycles/cycle) in the PD-out case. A master 701 and two devices 702, 704 are shown (device 0 and 1, respectively). Device 1 fails to receive the first two PD retransmissions 718, 722 from the master. It therefore switches to the last resort frequency for the message 726 in subcycle 2. The master has sent two PD transmissions and fails to receive a confirmation of successful reception of the PD from device 1 and therefore switches to the last resort frequency in subcycle 2. It received PD_ACK_CUR=0 in messages 720, 724 and did not receive another NACK packet in message 728.

Device 0, on the other hand, was able to receive the first PD transmission 706 from the master and a subsequent ACK (PD_ACK_CUR=1) message 708 was received correctly by the master. The master then sends an OD message 710 in subcycle 1 to device 0.

In subcycle 2 the master transmits an OD packet 714 to device 0. Since the master has one radio per track, however, this transmission is sent on the last resort frequency and will not be received by device 0 (as indicated by the dashed lines), which will try to receive the OD on $f_2$. The device does not shift to the last resort frequency because of the first successful reception 706 of the PD packet. The OD packet 714 in subcycle 2 sent from the master to device 0 is therefore sacrificed by the protocol due to the utmost need to transmit the third attempt of a PD packet from the master to device 1 on the best available frequency.

Those skilled in the art will recognize that the boundaries between logic and circuit blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of reliable communications between a master and a plurality of devices in a wireless communications network, comprising:
   said master and/or at least one of said plurality of devices autonomously hopping to a last resort frequency channel during a communications cycle for receipt of a high priority packet if a last subcycle of a cycle is reached and all previous high priority packet reception attempts were unsuccessful;
   wherein said master and/or at least one of said plurality of devices autonomously hopping to said last resort frequency channel does not rely on any communications therebetween within said wireless communications network; and
   wherein both said master and said plurality of devices are configured a priori with said last resort frequency channel to be used to transmit high priority packets.

2. The method according to claim 1, wherein said last resort frequency is selected from a group of best performing frequency channels thereby giving reception of the high priority packet in a last subcycle a relatively high probability of success.

3. The method according to claim 1, wherein said last resort frequency channel is the frequency channel allocated to a first subcycle in a preceding cycle thereby giving reception of the high priority packet in a last subcycle a relatively high probability of success.

4. The method according to claim 1, further comprising said master and/or at least one of said plurality of devices hopping to a next frequency channel in an original frequency channel hopping scheme previously configured in said master and said plurality of devices in the event any previous high priority packets were successfully received.

5. The method according to claim 1, further comprising said master and/or at least one of said plurality of devices hopping to a next frequency channel in a frequency channel table previously configured in said master and said plurality of devices for receipt of a low priority packet in the event any previous high priority packets were successfully received.

6. The method according to claim 1, wherein said master and/or at least one of said plurality of devices comprise a radio transmitter and a radio receiver configured to conform to the IO-Link Wireless standard.

7. A method of reliable communications between a master and a plurality of devices in a wireless communications network, comprising:
   said master and/or at least one of said plurality of devices autonomously hopping to a last resort frequency channel for transmission of a high priority packet if a last subcycle of a cycle is reached, high priority packet retransmissions have been attempted in previous subcycles, and all acknowledgements received as responses to said high priority packet retransmissions indicate unsuccessful transmissions, or if no acknowledgements are successfully received; and
   wherein both said master and said plurality of devices are configured a priori with said last resort frequency channel to be used to transmit high priority packets.

8. The method according to claim 7, wherein said last resort frequency channel is selected from a group of best performing frequency channels thereby giving transmission of the high priority packet in a last subcycle a relatively high probability of success.

9. The method according to claim 7, wherein said last resort frequency channel is the frequency channel allocated to a first subcycle in a preceding cycle thereby giving transmission of the high priority packet in a last subcycle a relatively high probability of success.

10. The method according to claim 7, further comprising said master and/or at least one of said plurality of devices otherwise hopping to a next frequency channel in an original frequency channel hopping scheme previously configured in said master and said plurality of devices.

11. The method according to claim 7, further comprising said master and/or at least one of said plurality of devices otherwise hopping to a next frequency channel in a frequency channel table previously configured in said master and said plurality of devices for transmission of a low priority packet.

12. The method according to claim 7, wherein said master and said plurality of devices autonomously hopping to said last resort frequency channel does not rely on any communications within said wireless communications network.

13. An apparatus for reliable communications between a master and a plurality of devices in a frequency hopping wireless communications network, comprising:
   a frequency hopping radio transmitter;
   a frequency hopping radio receiver;
   a processor coupled to and operative to control said frequency hopping radio transmitter and said frequency hopping radio receiver;
   said processor programmed to autonomously hop to a last resort frequency channel during a communications cycle for receipt of a high priority packet if a last subcycle of a cycle is reached and all previous high priority packet reception attempts were unsuccessful;
   wherein said processor autonomously hopping to said last resort frequency channel in said master and/or said plurality of devices does not rely on any communications therebetween within said wireless communications network; and
   wherein both said master and said plurality of devices are configured a priori with a last resort frequency channel to be used to transmit high priority packets.

14. The apparatus according to claim 13, wherein said radio transmitter and said radio receiver are configured to conform to the IO-Link Wireless standard.

15. The apparatus according to claim 13, wherein said last resort frequency channel is selected from a group of best performing frequency channels thereby giving reception of the high priority packet in a last subcycle a relatively high probability of success.

16. An apparatus for reliable communications between a master and a plurality of devices in a frequency hopping wireless communications network, comprising:
   a frequency hopping radio transmitter;
   a frequency hopping radio receiver;
   a processor coupled to and operative to control said frequency hopping radio transmitter and said frequency hopping radio receiver;
   said processor programmed to autonomously hop to said last resort frequency channel for transmission of a high priority packet if a last subcycle of a cycle is reached, high priority packet retransmissions have been attempted in previous subcycles, and all acknowledgements received indicate unsuccessful transmissions, or if no acknowledgements are successfully received; and
   wherein both said master and said plurality of devices are configured a priori with a last resort frequency channel to be used to transmit high priority packets.

17. The apparatus according to claim 16, wherein said radio transmitter and said radio receiver are configured to conform to the IO-Link Wireless standard.

18. The apparatus according to claim 16, wherein said last resort frequency is selected from a group of best performing frequency channels thereby giving transmission of the high priority packet in a last subcycle a relatively high probability of success.

19. The apparatus according to claim 16, wherein said last resort frequency channel is the frequency channel allocated to a first subcycle in a preceding cycle thereby giving reception of the high priority packet in a last subcycle a relatively high probability of success.

20. The apparatus according to claim 16, wherein said master and/or at least one of said plurality of devices hopping to a next frequency channel in a frequency channel table previously configured in said master and said plurality of devices for receipt of a low priority packet in the event any previous high priority packets were successfully received.

* * * * *